(12) United States Patent
Zaghetto et al.

(10) Patent No.: US 12,238,272 B2
(45) Date of Patent: Feb. 25, 2025

(54) ADAPTIVE MODE SELECTION FOR POINT CLOUD COMPRESSION

(71) Applicants: SONY GROUP CORPORATION, Tokyo (JP); Sony Corporation of America, New York, NY (US)

(72) Inventors: Alexandre Zaghetto, San Jose, CA (US); Ali Tabatabai, Cupertino, CA (US); Danillo Graziosi, Flagstaff, AZ (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 82 days.

(21) Appl. No.: 17/739,484

(22) Filed: May 9, 2022

(65) Prior Publication Data
US 2023/0104977 A1 Apr. 6, 2023

Related U.S. Application Data

(60) Provisional application No. 63/262,135, filed on Oct. 5, 2021.

(51) Int. Cl.
*H04N 19/103* (2014.01)
*H04N 19/119* (2014.01)
(Continued)

(52) U.S. Cl.
CPC ......... *H04N 19/103* (2014.11); *H04N 19/119* (2014.11); *H04N 19/147* (2014.11);
(Continued)

(58) Field of Classification Search
CPC .. H04N 19/103; H04N 19/119; H04N 19/147; H04N 19/176; H04N 19/42; H04N 19/597
See application file for complete search history.

(56) References Cited

U.S. PATENT DOCUMENTS

2017/0347120 A1  11/2017  Chou et al.
2020/0219290 A1  7/2020  Tourapis et al.
(Continued)

FOREIGN PATENT DOCUMENTS

CN  112601082 A  4/2021

OTHER PUBLICATIONS

A. F. R. Guarda, N. M. M. Rodrigues and F. Pereira, "Adaptive Deep Learning-Based Point Cloud Geometry Coding," in IEEE Journal of Selected Topics in Signal Processing, vol. 15, No. 2, pp. 415-430, Feb. 2021, doi: 10.1109/JSTSP.2020.3047520. (Year: 2020).*

(Continued)

*Primary Examiner* — Tat C Chio
(74) *Attorney, Agent, or Firm* — CHIP LAW GROUP

(57) ABSTRACT

An electronic device and method for adaptive mode selection for point cloud compression, is provided. The electronic device receives a 3D point cloud geometry and partitions the 3D point cloud geometry into a set of 3D blocks. For a 3D block of the set of 3D blocks, mode decision information is determined. The mode decision information includes class information of the 3D point cloud geometry, operational conditions associated with an encoding stage of the 3D point cloud geometry, or mode-related information associated with one or more 3D blocks of the set of 3D blocks. Based on the mode decision information, one or more modes are selected for the 3D block from a plurality of modes. Each mode corresponds to a function that is used to encode the 3D block. The 3D block is encoded based on the one or more modes.

20 Claims, 12 Drawing Sheets

(51) Int. Cl.
*H04N 19/147* (2014.01)
*H04N 19/176* (2014.01)
*H04N 19/42* (2014.01)
*H04N 19/597* (2014.01)

(52) U.S. Cl.
CPC .......... *H04N 19/176* (2014.11); *H04N 19/42* (2014.11); *H04N 19/597* (2014.11)

(56) References Cited

U.S. PATENT DOCUMENTS

| | | | |
|---|---|---|---|
| 2021/0105458 A1* | 4/2021 | Sugio | G06T 9/00 |
| 2022/0377327 A1* | 11/2022 | Park | H04N 19/167 |
| 2023/0164353 A1* | 5/2023 | Lee | H04N 19/105 |
| | | | 375/240.26 |

OTHER PUBLICATIONS

3DG, "G-PCC codec description", 128. MPEG Meeting; Oct. 7-Oct. 11, 2019; Geneva; (Motion Picture Expert Group or ISO/IEC JTC1/SC29/WG11), No. n18891 Dec. 13, 2019, XP030225589.

Tekalp A Murat et al: "Editorial: Introduction to the Issue on Deep Learning for Image/Video Restoration and Compression", IEEE Journal of Selected Topics in Signal Processing, IEEE, US, vol. 15, No. 2, Feb. 22, 2021 (Feb. 22, 2021), pp. 157-161, XP011840095, ISSN: 1932-4553, DOI: 10.1109/JSTSP.2021.3053364.

Tabatabai (Sony) A et al: "[EE13.54 Related] Discussion points on the AI tools evaluation procedures for point cloud compression and analysis", 135. MPEG Meeting; Jul. 12-Jul. 16, 2021; Online; (Motion Picture Expert Group or ISO/IEC JTC1/SC29/WG11), No. m57304 Jul. 8, 2021 (Jul. 8, 2021), XP030296826.

Shao, et al., "Hybrid Point Cloud Attribute Compression Using Slice-based Layered Structure and Block-based Intra Prediction", Proceedings of the 26th ACM international conference on Multimedia, Oct. 2018, pp. 1199-1207.

Guarda, et al., "Adaptive Deep Learning-Based Point Cloud Geometry Coding," IEEE, Journal of Selected Topics in Signal Processing, vol. 15, No. 2, Feb. 2021, pp. 415-430.

Wiegand, et al., "Overview of the H.264/AVC video coding standard", IEEE Transactions on Circuits and Systems for Video Technology, vol. 13, No. 7, Jul. 2003, pp. 560-576.

Sullivan, et al., "Overview of the High Efficiency Video Coding (HEVC) Standard", IEEE Transactions on Circuits and Systems for Video Technology, vol. 22, No. 12, Dec. 2012, pp. 1649-1668.

Bross, et al., "Overview of the Versatile Video Coding (VVC) Standard and Its Applications", IEEE Transactions on Circuits and Systems for Video Technology, vol. 31, No. 10, Oct. 2021, pp. 3736-3764.

Pan, et al., "Fast Mode Decision Algorithm for Intra prediction in H.264/AVC Video Coding", IEEE Transactions on Circuits and Systems for Video Technology, vol. 15, No. 7, Jul. 2005, pp. 813-822.

Wu, et al., "Fast intermode decision in H.264/AVC video coding", IEEE Transactions on Circuits and Systems for Video Technology, vol. 15, No. 7, Jul. 2005, pp. 953-958.

Zhao, et al., "Fast Mode Decision Algorithm for Intra Prediction in HEVC", Visual Communications and Image Processing (VCIP), 2011, 04 pages.

\* cited by examiner

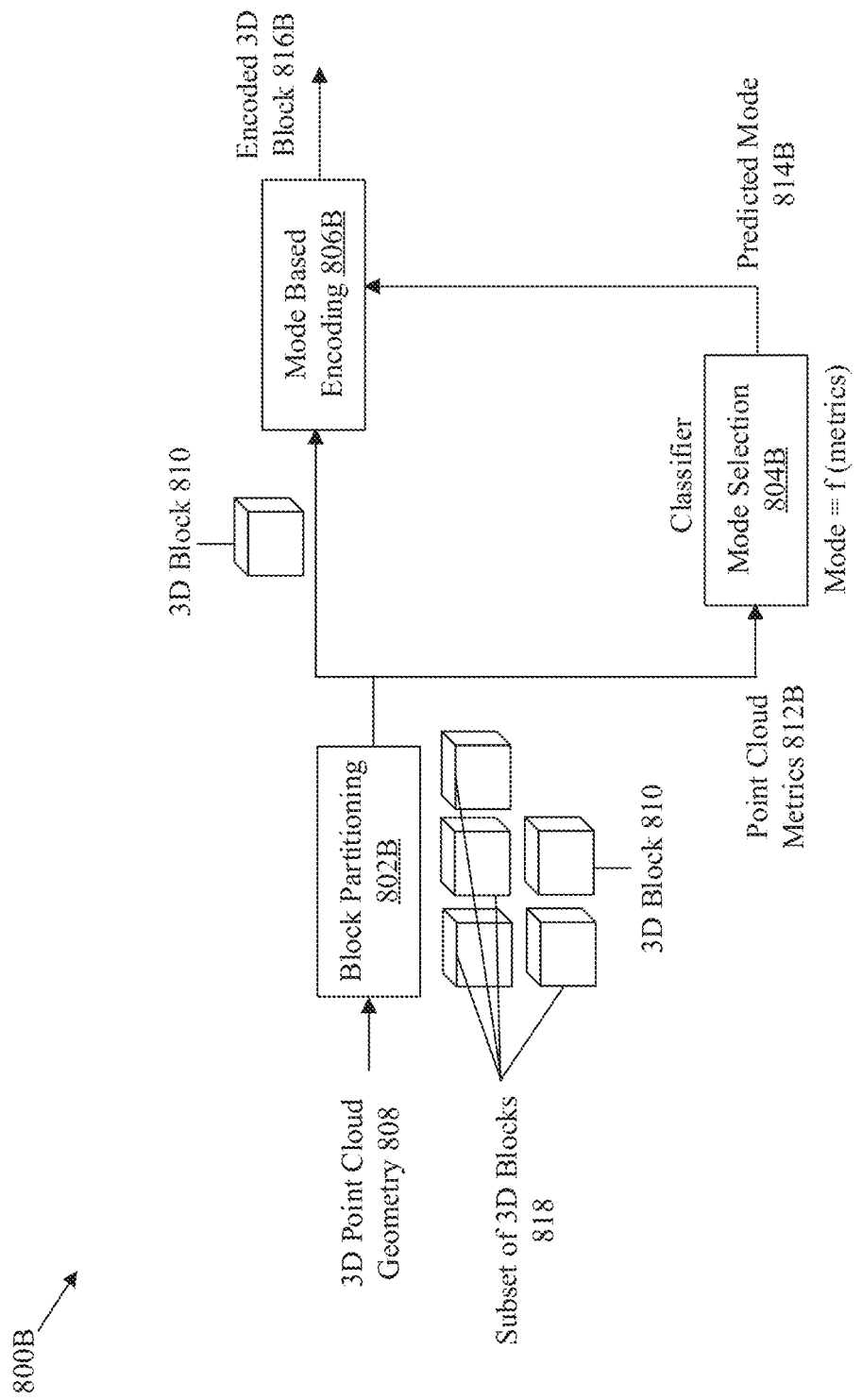

ADAPTIVE MODE SELECTION FOR POINT CLOUD COMPRESSION

REFERENCE

This application claims priority to U.S. Provisional Patent Application Ser. No. 63/262,135 filed on Oct. 5, 2021, the entire content of which is hereby incorporated herein by reference.

FIELD

Various embodiments of the disclosure relate to three-dimensional (3D) point cloud compression (PCC). More specifically, various embodiments of the disclosure relate to adaptive mode selection for point cloud compression.

BACKGROUND

Advancements in the field of three-dimensional (3D) scanning have provided the ability to create 3D geometrical representations of 3D objects. 3D point clouds are one example of the 3D geometrical representations, which have been adopted for different applications, such as free viewpoint display for sports or a live event relay broadcasting, geographic information systems, cultural heritage representations, or autonomous navigation of vehicles. Typically, 3D point clouds include a large number of unstructured 3D points (e.g., each point having X, Y, and Z coordinates) along with associated attributes, for example, texture including colors or reflectance. A 3D image of an object described by a 3D point cloud may contain order of magnitudes of raw data, which makes data storage, processing, and transmission a challenging task for any practical application. Thus, it may be desirable to have an efficient point cloud compression (PCC) approach. Some conventional PCC approaches require multiple encoding and decoding operations to compress even a portion of the 3D point cloud.

Such approaches can be computationally expensive and can constrain the memory resources available for computation.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for adaptive mode selection for point cloud compression is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 8B is a diagram that illustrates an exemplary processing pipeline for adaptive mode selection for point cloud compression, in accordance with an embodiment of the disclosure.

DETAILED DESCRIPTION

Figure 1:
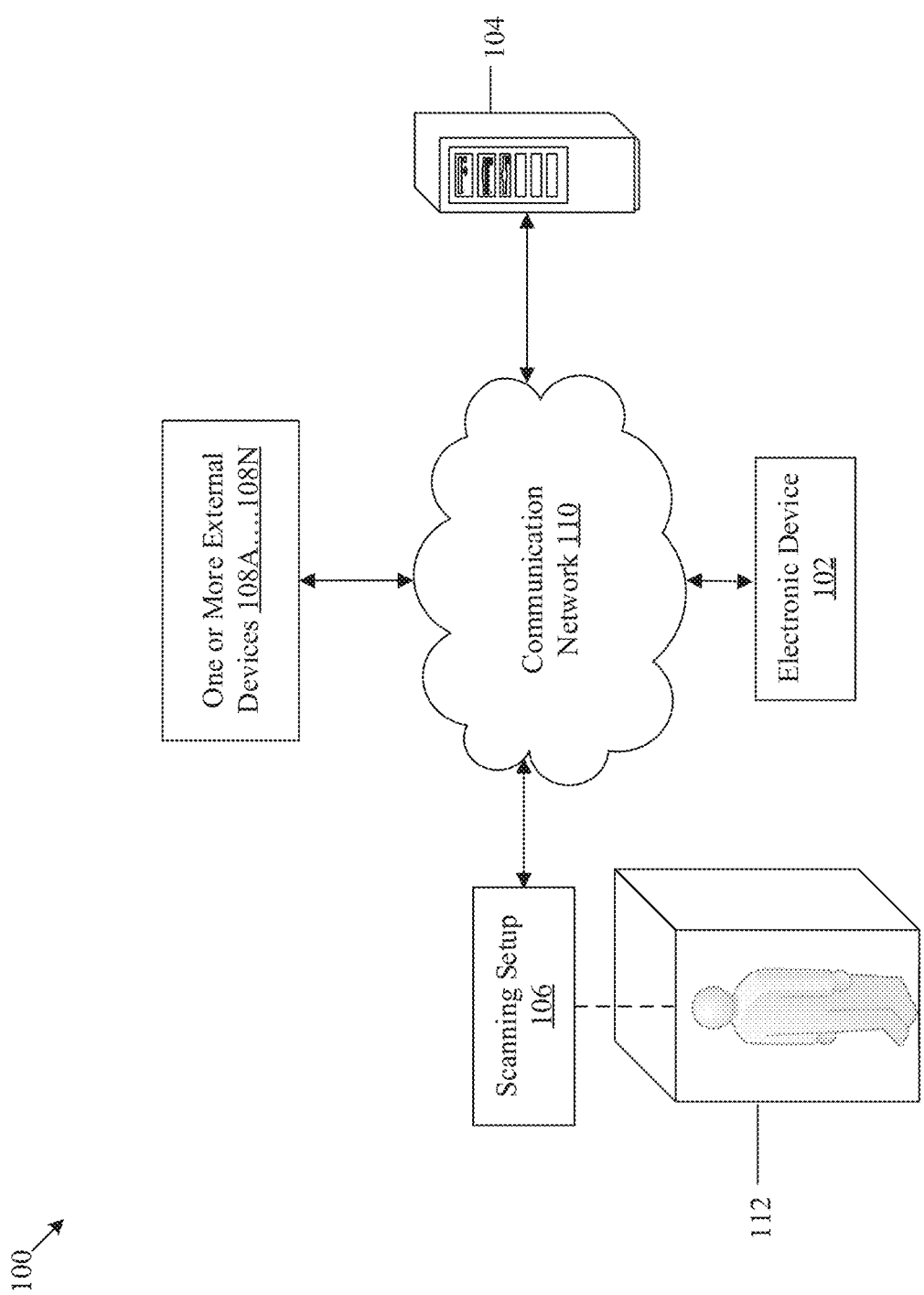
FIG. 1 is a block diagram that illustrates an exemplary environment for adaptive mode selection for point cloud compression, in accordance with an embodiment of the disclosure.

The following described implementations may be found in the disclosed electronic device and method of adaptive mode selection for point cloud compression. Exemplary aspects of the electronic device may include circuitry that may be configured to receive a three-dimensional (3D) point cloud geometry of a 3D point cloud associated with at least one object in a 3D space. The electronic device may be configured to partition the 3D point cloud geometry into a set of 3D blocks and determine mode decision information for a 3D block of the set of 3D blocks. The mode decision information may include, for example, class information associated with the 3D point cloud geometry, one or more operational conditions associated with an encoding stage of the 3D point cloud geometry, or mode-related information associated with one or more 3D blocks of the set of 3D blocks. The electronic device may be further configured to select one or more modes for the 3D block from a plurality of modes, based on the mode decision information. Each mode of the plurality of modes may correspond to a function that may be used to encode the 3D block. For example, the function may correspond to a Deep Neural Network (DNN) model that may be trained to encode the 3D block of the 3D point cloud geometry to generate an encoded 3D block. Each mode of the plurality of modes may correspond to, for example, an alpha parameter of a focal loss function used in a training stage of the DNN model. The focal loss function may be configured to penalize a removal of non-empty voxels from the 3D block of the 3D point cloud geometry. The electronic device may be further configured to encode the 3D block based on the selected one or more modes.

Some conventional point cloud compression (PCC) techniques involve a full mode search operation to search for an optimum mode to encode each 3D block of a 3D point cloud geometry. In the full mode search operation, a 3D block may be encoded based on each possible mode and the encoded 3D blocks may be reconstructed (i.e., decoded) to determine rate-distortion costs for all the possible modes. The mode corresponding to a lowest rate-distortion cost may be selected as the optimum mode associated with 3D block. Finally, the 3D block may be encoded based on the selected optimum mode. As the determination of the rate-distortion cost may require multiple encoding and decoding operations per block, the conventional PCC techniques may be computationally expensive and may have a high memory usage in the encoding stage of the point cloud geometry.

In contrast, the disclosed technique for point cloud compression does not require the full mode search operation to determine the optimum mode to encode each 3D block of a 3D point cloud geometry. Instead of encoding each 3D block using all possible modes (i.e., the full mode search), the disclosed technique uses mode decision information to select one or more modes and searches for the optimum mode from the selected one or more modes. The number of encoding and decoding operations required to determine the final mode to encode each 3D bock may be significantly reduced as compared to the full mode search per 3D block. Thus, the disclosed technique for point cloud compression may be computationally less intensive and may require less memory resources than conventional PCC techniques.

FIG. 1 is a block diagram that illustrates an exemplary environment for adaptive mode selection for point cloud compression, in accordance with an embodiment of the disclosure. With reference to FIG. 1, there is shown a network environment 100. The network environment 100 may include an electronic device 102, a server 104, a scanning setup 106, and a plurality of external devices 108A . . . 108N. The scanning setup 106 may include one or more image sensors (not shown) and one or more depth sensors (not shown) associated with the one or more image sensors. The electronic device 102 may be communicatively coupled to the server 104, the scanning setup 106, and the plurality of external devices 108A . . . 108N, via a communication network 110. There is further shown a three-dimensional (3D) point cloud geometry 112 of a 3D point cloud associated with at least one object (e.g., a person) in a 3D space.

The electronic device 102 may include suitable logic, circuitry, interfaces, and/or code that may be configured to encode and/or decode a 3D point cloud geometry (e.g., the 3D point cloud geometry 112). The 3D point cloud may include a plurality of points that together represent the object in the 3D space. As an example, each point may be represented as (x, y, z, r, g, b, a), where (x, y, z) represent 3D coordinates of a point on the object, (r, g, and b) represent red, green, and blue values of the point, and (a) may represent a transparency value of the point. In some embodiments, the electronic device 102 may be configured to generate the 3D point cloud of an object or a plurality of objects (e.g., a 3D scene that includes objects in foreground and background). The electronic device 102 may acquire the 3D point cloud geometry 112 of the object (or the plurality of objects) from the 3D point cloud. Examples of the electronic device 102 may include, but are not limited to, a computing device, a video-conferencing system, an augmented reality (AR) device, a virtual reality (VR device), a mixed reality (MR) device, a game console, a smart wearable device, a mainframe machine, a server, a computer work-station, and/or a consumer electronic (CE) device.

The server 104 may include suitable logic, circuitry, interfaces, and/or code that may be configured to generate the 3D point cloud of the object and store the 3D point cloud geometry 112 and information related to the 3D point cloud. Examples of the server 104 may include, but are not limited to, an application server, a cloud server, a web server, a database server, a file server, a gaming server, a mainframe server, or a combination thereof.

The scanning setup 106 may include suitable logic, circuitry, interfaces, and/or code that may be configured to scan a 3D environment that includes the object to generate a raw 3D scan (also referred as a raw 3D point cloud). In accordance with an embodiment, the scanning setup 106 may include a single image-capture device or a plurality of image-capture devices (arranged at multiple viewpoints) to capture a plurality of color images. In certain instances, additional depth sensors may be included in the scanning setup 106 to capture depth information of the object. The plurality of color images and the depth information of the object may be captured from different viewpoints. In such cases, the 3D point cloud may be generated based on the captured plurality of color images and the corresponding depth information of the object.

In accordance with an embodiment, the scanning setup 106 may be configured to execute a 3D scan of the object in the 3D space and generate a dynamic 3D point cloud (i.e., a point cloud sequence) that may capture changes in different attributes and geometry of the 3D points at different time-steps. The scanning setup 106 may be configured to communicate the generated 3D point cloud, the plurality of color images, and/or the corresponding depth information to the electronic device 102, via the communication network 110.

In accordance with an embodiment, the scanning setup 106 may include a plurality of sensors, such as a combination of a depth sensor, a color sensor (such as a red-green-blue (RGB) sensor), and/or a combination of an infrared (IR) projector an IR sensor. For example, the depth sensor may capture information associated with the point cloud geometry (3D location of the points), and the RGB and IR sensor may capture information associated with point cloud attributes (color and temperature, for instance). In an embodiment, the IR projector and the IR sensor may be used to estimate depth information. The combination of the depth sensor, the RGB sensor, and the IR sensor may be used to capture a point cloud frame (single static point cloud) or a plurality of point cloud frames (3D video), with the associated geometry and attributes.

In accordance with an embodiment, the scanning setup 106 may include an active 3D scanner that relies on radiations or light to capture a 3D structure of an object in the 3D space. Also, the scanning setup 106 may include an image sensor that may capture color information associated with the object. For example, the active 3D scanner may be a time-of-flight (TOF)-based 3D laser scanner, a laser rangefinder, a TOF camera, a hand-held laser scanner, a structured light 3D scanner, a modulated light 3D scanner, a CT scanner that outputs point cloud data, an aerial Light Detection and Ranging (LiDAR) scanner, a 3D LiDAR, a 3D motion sensor, and the like.

In FIG. 1, the scanning setup 106 is shown as separate from the electronic device 102. However, the disclosure may not be so limiting and in some embodiments, the scanning setup 106 may be integrated into the electronic device 102. Alternatively, the entire functionality of the scanning setup 106 may be incorporated in the electronic device 102, without deviating from the scope of the present disclosure. Examples of the scanning setup 106 may include, but are not limited to, a depth sensor, an RGB sensor, an IR sensor, an image sensor, and/or a motion-detector device.

Each of the plurality of external devices 108A . . . 108N may include suitable logic, circuitry, interfaces, and/or code that may be configured to communicate with the electronic device 102, via the communication network 110. In accordance with an embodiment, each of the plurality of external devices 108A . . . 108N may be configured to receive an encoded 3D point cloud geometry (as multimedia content) from the electronic device 102, via the communication network 110. The plurality of external devices 108A . . . 108N may be configured to decode the encoded 3D point cloud geometry to render a 3D model of the objects. Examples of the plurality of external devices 108A . . . 108N may include, but are not limited to, a display system, a computing device, a gaming device, a mobile phone, a television, or an electronic device with capability to store or render the multimedia content.

The communication network 110 may include a communication medium through which the electronic device 102 may be communicatively coupled to the server 104, the scanning setup 106, and the plurality of external devices 108A . . . 108N. Examples of the communication network 110 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to receive the 3D point cloud geometry 112 associated with at least one object in 3D space. For example, 3D point cloud data may be obtained from a 3D point cloud (or a 3D scan) that includes geometry and attributes. In an embodiment, the 3D point cloud may be a static point cloud. In another embodiment, the 3D point cloud may be a frame of a dynamic 3D point cloud (i.e., a point cloud sequence). In general, the 3D point cloud is a representation of geometrical information (e.g., the 3D coordinates of points) and attribute information of the object in the 3D space. The attribute information may include, but is not limited to, color information, reflectance information, opacity information, normal vector information, material identifier information, or texture information associated with the object in the 3D space. The texture information may represent a spatial arrangement of colors or intensities in the plurality of color images of the object. The reflectance information may represent information associated with an empirical model (e.g., a Phong shading model or a Gouraud Shading model) of a local illumination of feature points of the 3D point cloud. The empirical model of the local illumination may correspond to a reflectance (rough or shiny surface portions) on a surface of the object. The opacity information may represent the degree of transparency of a point. The normal vector information may represent the direction perpendicular to the plane tangent at a point. The material identifier information may represent an identifier that points to a material from a set of available materials.

The electronic device 102 may be further configured to generate a plurality of voxels from the 3D point cloud geometry 112. The generation of the voxels may be referred to as a voxelization of the 3D point cloud geometry 112. Conventional techniques to voxelize a 3D point cloud may be known to one ordinarily skilled in the art. Thus, the details of the voxelization are omitted from the disclosure for the sake of brevity.

Since the 3D point cloud geometry 112 can include a large number of data points (of the order of 104 or more, for example), transmission/reception of the data points can consume high network bandwidth. Similarly, the data points, in uncompressed state, can consume more storage than required. The 3D point cloud geometry 112 may have to be encoded such that the encoded point cloud data uses less network bandwidth for transmission/reception and less storage space that required. The encoding process of the 3D point cloud geometry 112 is described herein.

The electronic device 102 may be configured to partition the 3D point cloud geometry 112 into a set of 3D blocks. For a 3D block of the set of 3D blocks, the electronic device 102 may be configured to determine mode decision information. The mode decision information may include, for example, class information associated with the 3D point cloud geometry 112, one or more operational conditions associated with an encoding stage of the 3D point cloud geometry 112, or mode-related information associated with one or more 3D blocks of the set of 3D blocks. For example, the class information associated with the 3D point cloud geometry may include a geometry bit-depth, a density, or a point distribution associated with the 3D point cloud geometry 112. Similarly, the one or more operational conditions associated with the encoding stage of the 3D point cloud geometry 112 may include a target rate-distortion cost associated with 3D point cloud geometry 112.

The electronic device 102 may be further configured to select one or more modes for the 3D block from a plurality of modes, based on the mode decision information. Each mode may correspond to a function that may encode the 3D block. For example, the function may correspond to a Deep Neural Network (DNN) model that may be trained to encode the 3D block of the 3D point cloud geometry 112 to generate an encoded 3D block. In accordance with an embodiment, each mode may correspond to an alpha parameter of a focal loss function used in a training stage of the DNN model. The focal loss function may be configured to penalize a removal of non-empty voxels from the 3D block of the 3D point cloud geometry 112. The electronic device 102 may include a plurality of DNN models, each of which may be configured for a certain mode of the plurality of modes. For example, a first DNN model of the plurality of DNN models may correspond to a first mode associated with a first value of the alpha parameter. Similarly, a second DNN model of the plurality of DNN models may correspond to a second mode associated with a second value of the alpha parameter, and so on. The selection of the one or more modes is described further, for example, in FIGS. 4, 5, 6, 7, 8A, 8B, 9A, and 9B.

The electronic device 102 may be further configured to encode the 3D block based on the selected one or more modes. In an embodiment, the electronic device 102 may determine an optimal mode to encode the 3D block from the selected one or more modes. In certain scenarios, the selected one or more modes may include a single mode. In such scenarios, the optimum mode may be same as the selected mode. The determination of the optimum mode is described further, for example, in FIGS. 4, 5, 6, 7, 8A, 8B, 9A, and 9B.

The electronic device 102 may also determine mode(s) for all remaining blocks of the 3D point cloud geometry 112 and may encode the remaining blocks of the 3D point cloud geometry 112 to generate an encoded 3D point cloud geometry (that may include encoded 3D blocks).

In an embodiment, the electronic device 102 may generate supplemental information associated with the encoded 3D point cloud geometry. Examples of the supplemental information may include, but is not limited to, coding tables, the mode decision information, weight information, index values for geometrical information, and quantization parameters. The electronic device 102 may be further configured to transmit the encoded 3D point cloud geometry to at least one of the plurality of external devices 108A . . . 108N. The supplemental information may be transmitted along with the encoded 3D point cloud geometry.

Conventional point cloud compression (PCC) techniques involve a mode search operation to search for an optimum mode to encode each 3D block of the 3D point cloud geometry 112. In the mode search operation, each 3D block may be encoded based on all possible modes and the encoded 3D blocks may be reconstructed (i.e., decoded) to determine a rate-distortion cost for each of the possible modes. The mode that corresponds to the lowest rate-distortion cost may be selected as the optimum mode associated with 3D block. The 3D block may be encoded based on the selected optimum mode. As the determination of the rate-distortion cost may require multiple encoding and decoding operations per 3D block of the 3D point cloud geometry 112, the conventional PCC techniques may be computationally expensive and may have a high memory usage as compared to a desired usage. In contrast, the disclosed electronic device 102 may select one or more modes from the multiple possible modes (i.e., the plurality of modes) to encode a 3D block of the 3D point cloud geometry 112. Since not all of the multiple possible modes may have a significant effect on the rate-distortion performance of the encoding of 3D blocks, the use of the selected one or more modes (instead of all the possible modes) to encode the 3D block may not degrade the compression quality of the 3D point cloud geometry 112. Further, as the rate-distortion cost of the 3D block may be required to be determined for a lesser number of modes, the number of encoding and decoding operations associated with the determination of the rate-distortion cost may decrease. Thus, the computational and memory requirements associated with the compression of the 3D block may be reduced, which may thereby increase the efficiency associated with the compression of the 3D point cloud geometry 112.

Figure 2:
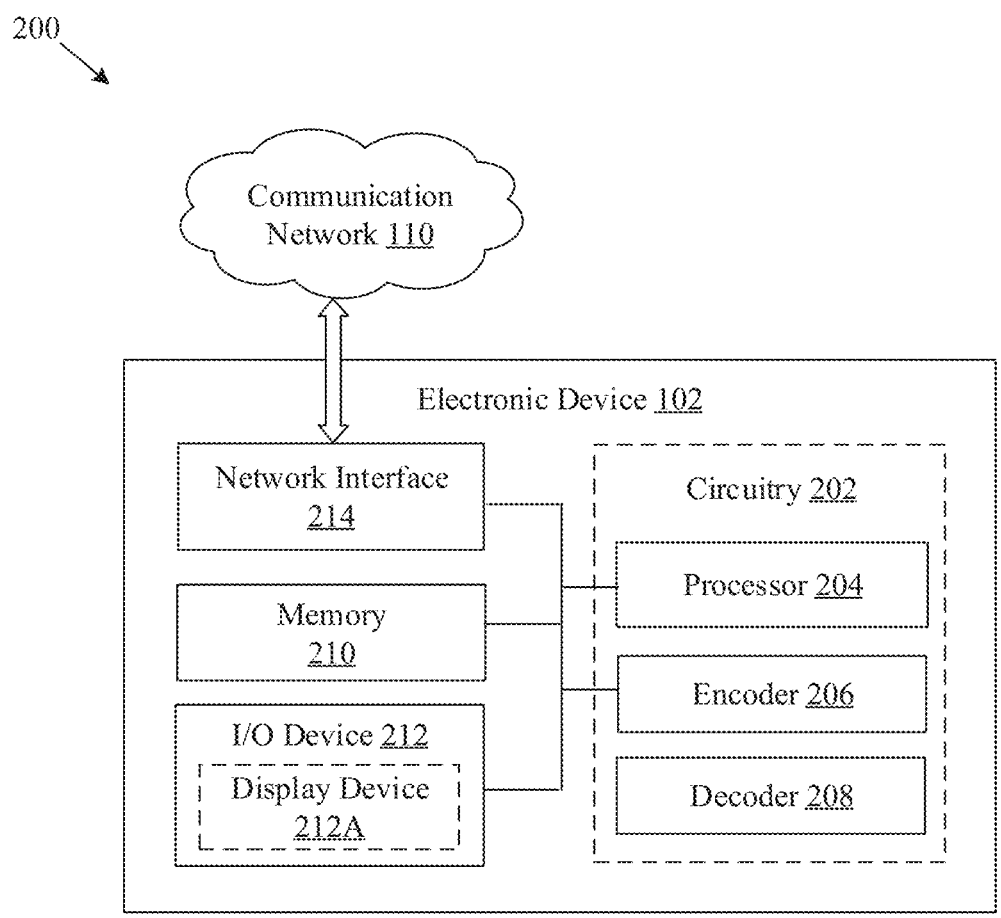
FIG. 2 is a block diagram that illustrates the exemplary electronic device of FIG. 1, in accordance with an embodiment of the disclosure.

FIG. 2 is a block diagram that illustrates the exemplary electronic device of FIG. 1, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202. The circuitry may include a processor 204 and an encoder 206. In some embodiments, the circuitry 202 may also include a decoder 208. The electronic device 102 may further include a memory 210, an input/output (I/O) device 212, and a network interface 214. The I/O device 212 may include a display device 212A which may be utilized to render multimedia content, such as a 3D point cloud or a 3D graphic model rendered from the 3D point cloud. The circuitry 202 may be communicatively coupled to the memory 210, the I/O device 212, and the network interface 214. The circuitry 202 may be configured to communicate with the server 104, the scanning setup 106, and the plurality of external devices 108A . . . 108N by use of the network interface 214.

The processor 204 may comprise suitable logic, circuitry, and/or interfaces that may be configured to execute instructions associated with the encoding of the 3D point cloud of an object. Also, the processor 204 may be configured to execute instructions associated with generation of the 3D point cloud of the object in the 3D space and/or reception of the plurality of color images and the corresponding depth information. The processor 204 may be further configured to execute various operations related to transmission and/or reception of the 3D point cloud (as the multimedia content) to and/or from at least one of the plurality of external devices 108A . . . 108N. Examples of the processor 204 may be a Graphical Processing Unit (GPU), a Central Processing Unit (CPU), a Tensor Processing Unit (TPU), a Reduced Instruction Set Computing (RISC) processor, an Application-Specific Integrated Circuit (ASIC) processor, a Complex Instruction Set Computing (CISC) processor, a co-processor, other processors, and/or a combination thereof. In accordance with an embodiment, the processor 204 may be configured to assist the encoder 206 to encode the 3D point cloud and the decoder 208 to decode the encoded 3D point cloud and other functions of the electronic device 102.

The encoder 206 may include suitable logic, circuitry, and/or interfaces that may be configured to encode a 3D point cloud geometry that corresponds to an object in the 3D space. In an embodiment, the encoder 206 may encode the 3D point cloud by encoding each 3D block associated with the 3D point cloud geometry. In an embodiment, the encoder 206 may generate supplemental information associated with the encoded 3D point cloud geometry.

In certain embodiments, the encoder 206 is configured to manage storage of the encoded 3D point cloud geometry in the memory 210 and/or transfer of the encoded 3D point cloud geometry to other media devices (e.g., a portable media player), via the communication network 110.

In some embodiments, the encoder 206 may be implemented as a Deep Neural Network (in the form of computer-executable code) on a GPU, a CPU, a TPU, a RISC processor, an ASIC processor, a CISC processor, a co-processor, other processors, and/or a combination thereof. In some other embodiments, the encoder 206 may be implemented as a Deep Neural Network on a specialized hardware interfaced with other computational circuitries of the electronic device 102. In such an implementation, the encoder 206 may be associated with a specific form factor on a specific computational circuitry. Examples of the specific computational circuitry may include, but are not limited to, a field programmable gate array (FPGA), programmable logic devices (PLDs), an ASIC, a programmable ASIC (PL-ASIC), application specific integrated parts (ASSPs), and a System-on-Chip (SOC) based on standard microprocessors (MPUs) or digital signal processors (DSPs). In accordance with an embodiment, the encoder 206 may be also interfaced with a GPU to parallelize operations of the encoder 206. In accordance with another embodiment, the encoder 206 may be implemented as a combination of programmable instructions stored in the memory 210 and logical units (or programmable logic units) on a hardware circuitry of the electronic device 102.

The decoder 208 may include suitable logic, circuitry, and/or interfaces that may be configured to decode encoded information that may represent the geometrical information of the object. The encoded information may also include the supplemental information, for example, coding tables, weight information, mode information, index values for the geometrical information and quantization parameters, to assist the decoder 208. As an example, the encoded information may include the encoded 3D point cloud geometry. The decoder 208 may be configured to reconstruct the 3D point cloud geometry by decoding the encoded 3D point cloud geometry. In accordance with an embodiment, the decoder 208 may be present on at least one of the plurality of external device 108A . . . 108N.

The memory 210 may include suitable logic, circuitry, and/or interfaces that may be configured to store instructions executable by the circuitry 202. The memory 210 may be configured to store operating systems and associated applications. The memory 210 may be further configured to store the 3D point cloud (including the 3D point cloud geometry 112) corresponding to the object. In accordance with an embodiment, the memory 210 may be configured to store information related to the plurality of modes and the table that maps the plurality of modes with classes and operational conditions. Examples of implementation of the memory 210 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 212 may include suitable logic, circuitry, interfaces, and/or code that may be configured to receive a user input. The I/O device 212 may be further configured to provide an output in response to the user input. The I/O device 212 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display device 212A and/or a speaker.

The display device 212A may include suitable logic, circuitry, interfaces, and/or code that may be configured to render the 3D point cloud onto a display screen of the display device 212A. In accordance with an embodiment, the display device 212A may include a touch screen to receive the user input. The display device 212A may be realized through several known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 212A may refer to a display screen of smart-glass device, a 3D display, a see-through display, a projection-based display, an electro-chromic display, and/or a transparent display.

The network interface 214 may include suitable logic, circuitry, interfaces, and/or code that may be configured to establish a communication between the electronic device 102, the server 104, the scanning setup 106, and the plurality of external devices 108A . . . 108N, via the communication network 110. The network interface 214 may be implemented by use of various known technologies to support wired or wireless communication of the electronic device 102 with the communication network 110. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 214 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS). The operation of the circuitry 202 is described in detail, for example, in FIGS. 3, 4, 5, 6, 7, 8A, 8B, 9A, 9B, and 10.

Figure 3:
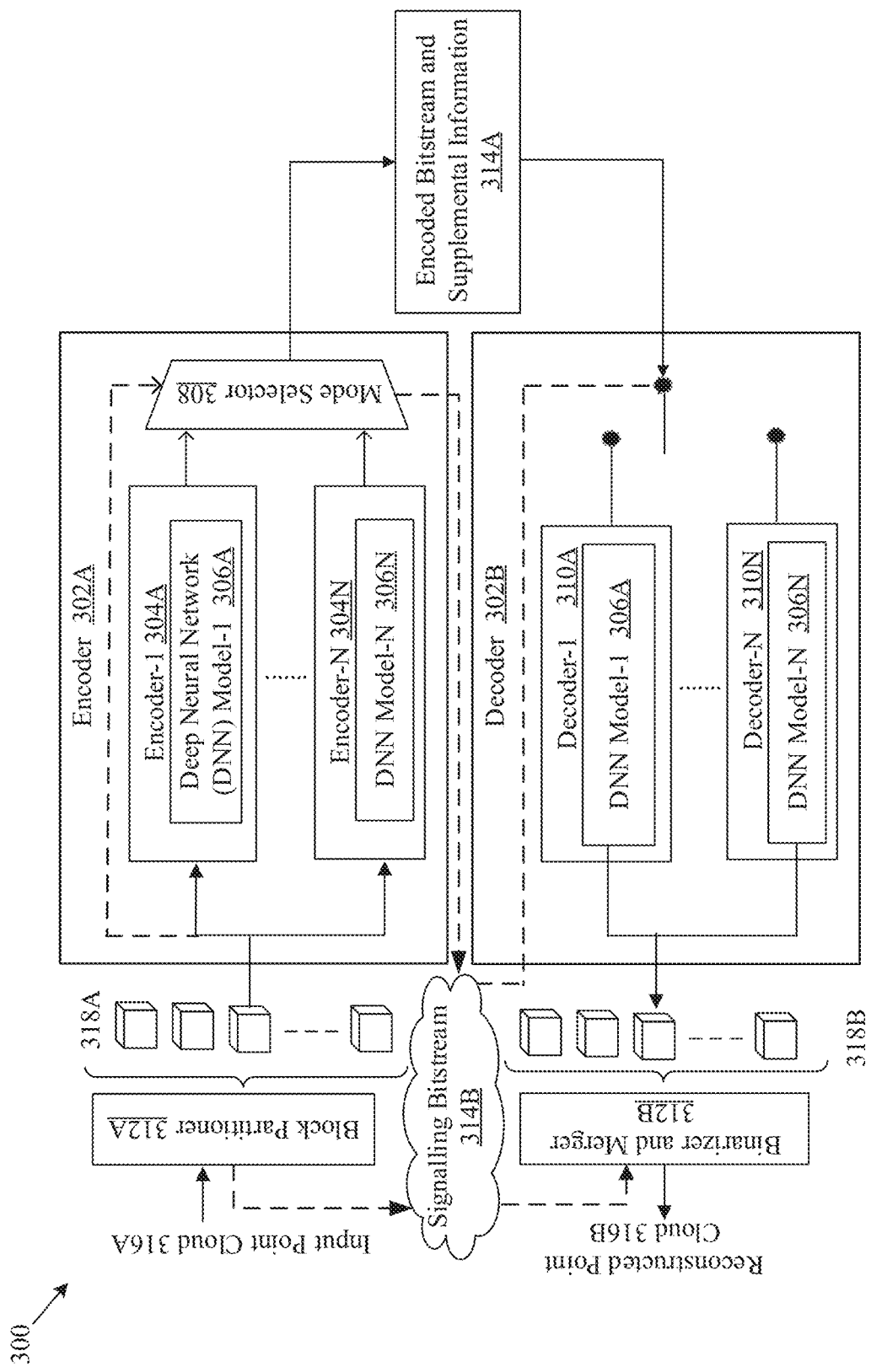
FIG. 3 illustrates a block diagram of an exemplary encoder and an exemplary decoder for adaptive mode selection for point cloud compression, in accordance with an embodiment of the disclosure.

FIG. 3 is a block diagram of an exemplary encoder and an exemplary decoder for an adaptive mode selection for point cloud compression, in accordance with an embodiment of the disclosure. FIG. 3 is explained in conjunction with elements from FIG. 1 and FIG. 2. With reference to FIG. 3, there is shown a block diagram 300 that includes an encoder 302A and a decoder 302B. The encoder 302A may be an exemplary implementation of the encoder 206 of FIG. 2 and the decoder 302B may be an exemplary implementation of the decoder 208 of FIG. 2.

In an embodiment, the encoder 302A and the decoder 302B may be implemented on a separate electronic device. In another embodiment, both the encoder 302A and the decoder 302B may be implemented on the electronic device 102. The decoder 302B may be also implemented on each of the one or more external devices 108A . . . 108N.

The encoder 302A may include a set of encoders, such as, a first encoder (e.g., an encoder-1 304A), . . . and an Nth encoder (e.g., an encoder-N 304N). Each of the set of encoders of the encoder 302A may include an associated neural network model. For example, the encoder-1 304A may include a first deep neural network (DNN) model, such as a DNN model-1 306A. Further, the encoder-N 304N may include an Nth DNN model, such as a DNN model-N 306N. The encoder 302A may further include a mode selector 308, which may be communicatively coupled to each of the encoder-1 304A, . . . and the encoder-N 304N.

Each deep neural network model (e.g., the DNN model-1 306A) may be a neural network model including a computational network or a system of artificial neurons, arranged in a plurality of layers, as nodes. The plurality of layers of the neural network model may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model. Outputs of each hidden layer may be coupled to inputs of at least one node in other layers of the neural network model. Node(s) in the final layer may receive inputs from at least one hidden layer to output a result. The number of layers and the number of nodes in each layer may be determined from hyper-parameters of the neural network model. Such hyper-parameters may be set before or after training the neural network model on a training dataset.

Each node of the neural network model may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to same or a same mathematical function.

In training of the neural network model, one or more parameters of each node of the neural network may be updated based on whether an output of the final layer for a given input (from the training dataset) matches a correct result based on a loss function for the neural network model. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like.

The neural network model may include electronic data, which may be implemented as, for example, a software component of an application executable on an electronic device (for example, the electronic device 102). The neural network model may rely on libraries, external scripts, or other logic/instructions for execution by a processing device, such as the circuitry 202. The neural network model may include code and routines configured to enable a computing device, such as the circuitry 202 to perform one or more operations to encode or decode a 3D block associated with a 3D point cloud geometry. Additionally, or alternatively, the neural network model may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model may be implemented using a combination of hardware and software.

The decoder 302B include a set of decoders, such as, a first decoder (e.g., a decoder-1 310A), . . . and an Nth decoder (e.g., a decoder-N 310N). Each of the set of decoders may include an associated neural network model. For example, the decoder-1 310A may include a first DNN model, such as the DNN model-1 306A. Further, the decoder-N 310N may include an Nth DNN model, such as the DNN model-N 306N. In FIG. 3, there is shown a block partitioner 312A associated with the encoder 302A and a binarizer and merger 312B associated with the decoder 302B. Also shown are encoded bitstream and supplemental information 314A, a signaling bitstream 314B, an input point cloud 316A, a reconstructed point cloud 316N, and a set of 3D blocks 318.

In operation, the input point cloud 316A including the 3D point cloud geometry 112 may be received for compression. The block partitioner 312A may receive the input point cloud 316A and partition the input point cloud 316A into a set of 3D blocks 318. The encoder 302A may receive the set of 3D blocks 318 from the block partitioner 312A. Each 3D block from the set of 3D blocks 318 may be input to the mode selector 308 and each of the encoder-1 304A, . . . and the encoder-N 304N. The encoder-1 304A may include an encoder circuitry and/or software (such as, the encoder 206) to encode the 3D block for a determination of a first encoded block, based on an application of the DNN model-1 306A on the 3D block. The encoding of the 3D block based on the DNN model-1 306A may correspond to an encoding by use of a first mode from the plurality of modes. For example, the first mode may correspond to a first value (e.g., 0.5) of an alpha parameter of a focal loss function that may be used to train the DNN model-1 306A. Herein, the focal loss function may be configured to penalize a removal of non-empty voxels from the 3D block of the 3D point cloud geometry 112. Similarly, the encoder-N 304N may include an encoder circuitry and/or software (such as, the encoder 206) to encode the 3D block for a determination of an Nth encoded block based on an application of the DNN model-N 306N on the 3D block. The encoding of the 3D block based on the DNN model-N 306N may correspond to an encoding by use of an Nth mode from the plurality of modes.

The encoder-1 304A may further include a decoder circuitry and/or software (such as, the decoder 208) to decode the first encoded block for a determination of a first decoded block based on an application of the DNN model-1 306A on the first encoded block. The decoding of the first encoded block based on the DNN model-1 306A may correspond to a decoding by use of the first mode. Similarly, the encoder-N 304N may include a circuitry and/or software (such as, the decoder 208) to decode the Nth encoded block for a determination of an Nth decoded block based on an application of the DNN model-N 306N on the Nth encoded block. The decoding of the Nth encoded block based on the DNN model-N 306N may correspond to a decoding by use of the Nth mode.

The mode selector 308 may receive the 3D block and may further receive the first decoded block from the encoder-1 304A, . . . and may receive the Nth decoded block from the encoder-N 304N. The mode selector 308 may compare the 3D block with the first decoded block to determine a first rate-distortion cost associated with the encoding of the 3D block by use of the first mode. Similarly, the mode selector 308 may compare the 3D block with the Nth decoded block to determine an Nth rate distortion cost associated with the encoding of the 3D block by use of the Nth mode. The mode selector 308 may then compare the first rate-distortion cost, . . . and the Nth rate-distortion cost with one another. Based on the comparisons between the rate distortion costs, the mode selector 308 may determine the mode that corresponds to the smallest rate distortion cost. The mode selector 308 may select the determined mode as a mode selected for the encoding of the 3D block.

The encoder 302A may be configured to encode the 3D block based on the mode selected by the mode selector 308. The encoding of the 3D blocks included in the 3D point cloud geometry 112 may convert the 3D point cloud geometry 112 into a bitstream (i.e., an encoded bitstream) of compressed point cloud data. The encoder 302A may transmit the bitstream of compressed point cloud data along with supplemental information associated with the 3D point cloud geometry 112, as the encoded bitstream and supplemental information 314A. Examples of the supplemental information may include, but is not limited to, the mode decision information, coding tables, weight information, index values for geometrical information, and quantization parameters. The encoder 302A and the block partitioner 312A may together transmit the signaling bitstream 314B to the decoder 302B. The signaling bitstream 314B may include, but is not limited to, information associated with partitioning of the 3D point cloud geometry 112 into the set of 3D blocks 318, and the mode decision information (for example, the mode selected by the mode selector 308 to encode the 3D block).

The decoder 302B may be configured to receive the encoded bitstream and supplemental information 314A and the signaling bitstream 314B from the encoder 302A. In an embodiment, the decoder 302B may determine a mode to decode the encoded bitstream based on the mode decision information in the signaling bitstream 314B. In an example, the decoder 302B may determine that the first mode may be used to decode the encoded bitstream. The decoder-1 310A may include a decoder circuitry and/or software (such as, the decoder 208) to decode a first encoded block (from the encoded bitstream) for a determination of a first decoded block based on an application of the DNN model-1 306A on the first encoded block. The decoding of the first encoded block based on the DNN model-1 306A may correspond to a decoding of the first encoded block by use of the first mode. Similarly, the decoder-N 310N may include a circuitry and/or software (such as, the decoder 208) to decode an Nth encoded block (from the encoded bitstream) for a determination of an Nth decoded block based on an application of the DNN model-N 306N on the Nth encoded block. The decoding of the Nth encoded block based on the DNN model-N 306N may correspond to a decoding of the Nth encoded block by use of the Nth mode.

The decoder 302B may be configured to select a mode to decode a certain encoded block from the received encoded bitstream (in the encoded bitstream and supplemental information 314A) based on the mode decision information (in the signaling bitstream 314B) associated with the encoded block. Based on a mode selected for the encoded block, the decoder 302B may decode the encoded block to determine a decoded block. For example, in case the first mode is selected to decode an encoded block, the decoder 302B may decode the encoded block based on the first mode. In such case, the decoder 302B may select the decoder-1 310A (that may be associated with the DNN model-1 306A) to decode the encoded block. The decoder 302B may be configured to determine the set of decoded blocks 318B based on a decoding of each encoded block in the encoded bitstream.

The binarizer and merger 312B may receive the set of decoded blocks 318B from the decoder 302B. Further, the binarizer and merger 312B may receive the signaling bitstream 314B from the encoder 302A. Based on the received signaling bitstream 314B, the binarizer and merger 312B may binarize and merge the received set of decoded blocks 318B to obtain the reconstructed point cloud 316N. In an example, the binarizer and merger 312B may use the information associated with partitioning of the 3D point cloud geometry 112 in the signaling bitstream 314B to binarize and merge the set of decoded blocks 318B.

Figure 4:
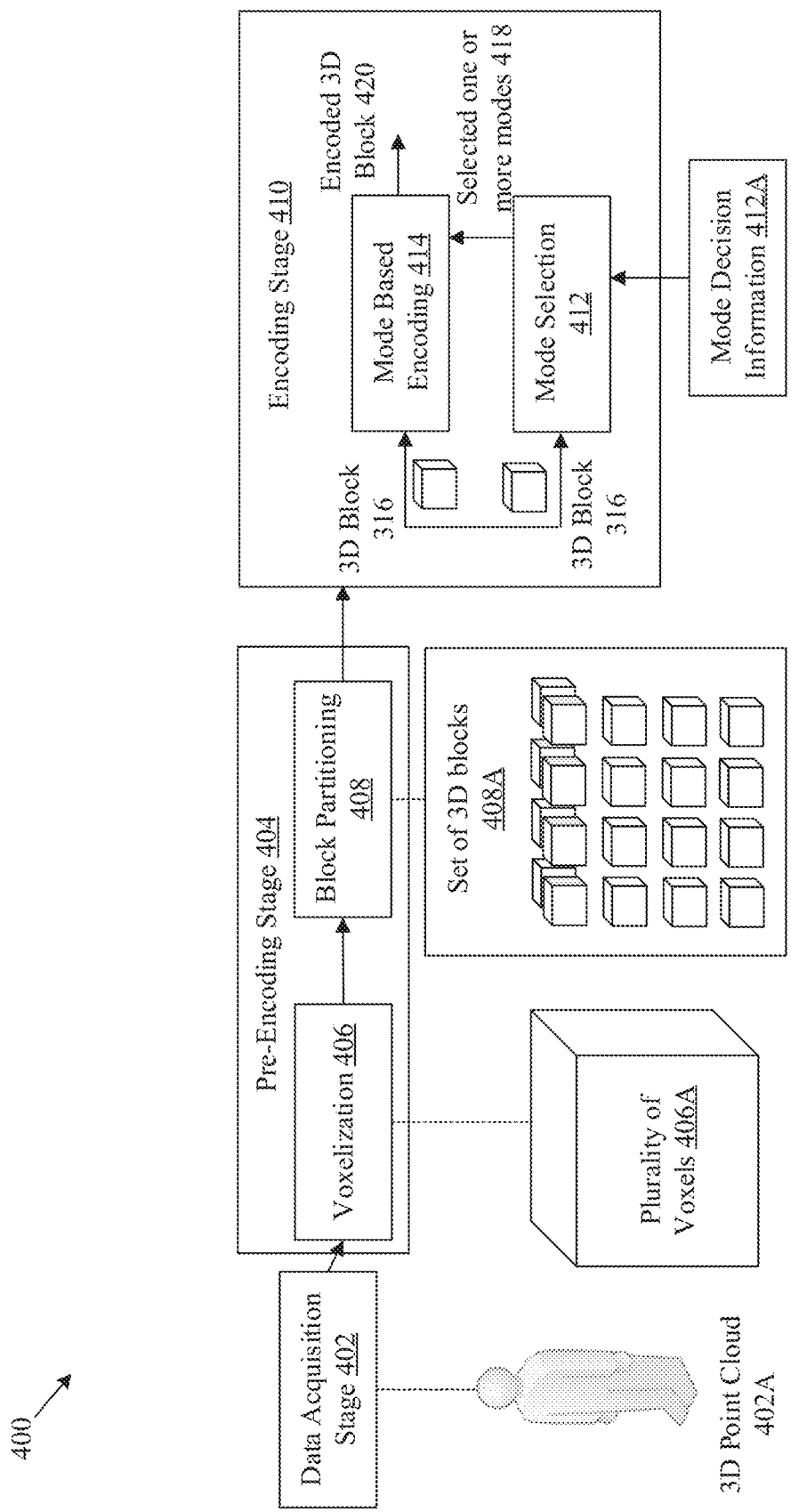
FIG. 4 is a diagram that illustrates an exemplary processing pipeline for adaptive mode selection for point cloud compression, in accordance with an embodiment of the disclosure.

FIG. 4 is a diagram that illustrates an exemplary processing pipeline for adaptive mode selection for point cloud compression, in accordance with an embodiment of the disclosure. FIG. 4 is explained in conjunction with elements from FIG. 1, FIG. 2, and FIG. 3. With reference to FIG. 4, there is shown a processing pipeline 400 for adaptive mode selection for point cloud compression. In the processing pipeline 400, there is shown a sequence of operations that may start from 402 and end at 414. The sequence of operations may be executed by the circuitry 202 of the electronic device 102. There is also shown outputs obtained at individual stages of operation.

At 402, a data acquisition operation may be executed. In the data acquisition operation, the processor 204 may be configured to acquire a 3D point cloud 402A that may correspond to one or more objects (such as a person) in the 3D space. The 3D point cloud 402A may be a representation of geometrical information and attribute information of the one or more objects in 3D space. The geometrical information may be indicative of 3D coordinates (such as XYZ coordinates) of individual feature points of the 3D point cloud 402A. Without the attribute information, the 3D point cloud 402A may be represented as a 3D point cloud geometry (e.g., the 3D point cloud geometry 112) associated with the one or more objects. The attribute information may include, for example, color information, reflectance information, opacity information, normal vector information, material identifier information and texture information of the one or more objects. In accordance with an embodiment, the 3D point cloud 402A may be received from the scanning setup 106, via the communication network 110 or directly acquired from an in-built scanner that may have same functionalities as that of the scanning setup 106.

Each feature point in the 3D point cloud 402A may be represented as $(x, y, z, Y, Cb, Cr, \alpha, a_1, \ldots a_n)$, where $(x, y, z)$ may be 3D coordinates that may represent the geometrical information and $(Y, Cb, Cr)$ may be luma, chroma-blue difference, and chroma-red difference components (in YCbCr or YUV color space) of the feature point. $\alpha$ may be a transparency value of the feature point, and $a_1$ to $a_n$ represent one or multi-dimensional attributes like material identifier and normal vector. Collectively, Y, Cb, Cr, $\alpha$ and $a_1$ to $a_n$ may represent the attribute information of each feature point of the 3D point cloud 402A.

At 404, pre-encoding stage operations may be executed. The pre-encoding stage operations may include operations, such as operations 406 and 408 that may be executed by the processor 204, as described herein.

At 406, a voxelization operation may be executed on the 3D point cloud 402A. In the voxelization operation, the processor 204 may be configured to generate a plurality of voxels 406A from the 3D point cloud 402A. Each generated voxel may represent a volumetric element of one or more objects in a 3D space. The volumetric element may be indicative of attribute information and geometrical information corresponding to a group of feature points of the 3D point cloud 402A.

An example of the process of voxelization for the 3D point cloud 402A is presented herein. The 3D space corresponding to the 3D point cloud 402A may be considered as a cube that may be recursively partitioned into a plurality of sub-cubes (such as octants). The size of each sub-cube may be based on the density of the plurality of feature points in the 3D point cloud 402A. The plurality of feature points of the 3D point cloud 402A may occupy different sub-cubes. Each sub-cube may correspond to a voxel and may contain a set of feature points of the 3D point cloud 402A, within a specific volume of the corresponding sub-cube. The processor 204 may be configured to compute an average of the attribute information associated with set of feature points of the corresponding voxel. Also, the processor 204 may be configured to compute center coordinates for each voxel of the plurality of voxels 406A based on the geometrical information associated with the corresponding set of feature points within the corresponding voxel. Each voxel of the generated plurality of voxels 406A may be represented by the center coordinates and the average of the attribute information associated with the corresponding set of feature points.

In accordance with an embodiment, the process of voxelization of the 3D point cloud 402A may be done using conventional techniques that may be known to one ordinarily skilled in the art. Thus, the details of the conventional techniques are omitted from the disclosure for the sake of brevity. The plurality of voxels 406A may represent geometrical information and the attribute information of the one or more objects in the 3D space. The plurality of voxels 406A may include occupied voxels and unoccupied voxels. The unoccupied voxels may not represent the geometrical information and the attribute information of the one or more objects in the 3D space. Only the occupied voxels may represent the geometrical information and the attribute information (such as color information) of the one or more objects. In accordance with an embodiment, the processor 204 may be configured to identify the occupied voxels from the plurality of voxels 406A.

At 408, a block partitioning operation may be executed on the plurality of voxels 406A. In the block partitioning operation, the processor 204 may be configured to partition the plurality of voxels 406A of the 3D point cloud geometry 112 into a set of 3D blocks (for example, the set of 3D blocks 408A). For example, the processor 204 may partition the 3D point cloud geometry 112 into 3D blocks, each of which may be of a pre-determined size, such as, 64×64×64. In an embodiment, the 3D point cloud geometry 112 may be partitioned into 3D blocks of same size. In another embodiment, the 3D point cloud geometry 112 may be partitioned into 3D blocks of different sizes. For example, the plurality of voxels 406A may include a first set of voxels that may be densely occupied and a second set of voxels that may be sparsely occupied. While a portion of the 3D point cloud geometry 112 that includes densely occupied voxels may be partitioned into a first set of 3D blocks of size 32×32×32, another portion of the 3D point cloud geometry 112 that includes sparsely occupied voxels may be partitioned into a second set of 3D blocks of the size 64×64×64. In accordance with an embodiment, the processor 204 may select a block size to partition different portions of the 3D point cloud geometry 112 based on a tradeoff between a computation cost associated with the partitioning operation and a density of occupancy of the partitioned 3D blocks.

At 410, encoding stage operations may be executed. The encoding stage operations may include operations from 412 to 414 that may be executed by the encoder 206, as described herein.

At 412, a mode selection operation may be executed. In the mode selection operation, the processor 204 may be configured to determine mode decision information for a 3D block 416 of the set of 3D blocks 408A. In an alternate embodiment, the mode selection operation may be executed by the encoder 206. The mode decision information 412A may include, for example, class information associated with the 3D point cloud geometry 112, one or more operational conditions associated with an encoding stage (e.g., the encoding stage 410) of the 3D point cloud geometry 112, or mode-related information associated with one or more 3D blocks of the set of 3D blocks 408A. Further, the processor 204 may be configured to select one or more modes (for example, selected one or more modes 418) for the 3D block 416 from a plurality of modes, based on the mode decision information. Herein, each mode of the plurality of modes may correspond to a function that may be used to encode a 3D block.

In an embodiment, the one or more modes may be selected based on a lookup from a table that may map modes to classes and operational conditions. In another embodiment, the one or more modes may be selected for a first number (e.g., "N") of current 3D blocks based on modes used to encode a second number (e.g., "M") of previous 3D blocks. The second number of previous 3D blocks may precede the first number of current 3D blocks, based on a scan of the set of 3D blocks 408A in a defined scan order (such as, a Z-scan order). In another embodiment, the one or more modes may be selected based on modes used by 3D blocks adjacent to the current 3D block in a spatial arrangement of the set of 3D blocks 408A in the 3D point cloud geometry 112. In another embodiment, the one or more modes may be selected based on application of a classifier on the current 3D block (and/or 3D blocks in the neighborhood of the current 3D block) and point cloud metrics associated with the current 3D block (and/or 3D blocks in a neighborhood of the current 3D block). In another embodiment, the one or more modes may be selected based on a direct application of a convolutional neural network model on the current 3D block (and/or 3D blocks in the neighborhood of the current 3D block).

Depending on the mode decision information, the one or more modes may be selected. In case the one or more modes include more than one mode, the processor 204 may determine a rate-distortion cost associated with each of the selected one or more modes and compare the determined rate-distortion costs with one another. Based on the comparison of the determined rate-distortion costs, the processor 204 may select a mode with the least rate-distortion cost as an optimum mode from the selected one or more modes to encode the current 3D block. In another scenario, in case the one or more modes includes a single mode, the rate-distortion cost of the mode may not be determined. Instead, the single mode may itself be the optimum mode, which may be used to encode the current 3D block. The determination of the mode decision information and the selection of the one or more modes are described further, for example, in FIGS. 5, 6, 7, 8A, 8B, 9A, and 9B.

At 414, a mode-based encoding operation may be executed. In the mode-based encoding operation, the encoder 206 may be configured to encode the 3D block 416 based on the selected one or more modes 418. For example, the encoder 206 may encode the 3D block 416 to obtain an encoded 3D block 420 based on the selected one or more modes 418. The encoding of the 3D block is described further, for example, in FIGS. 5, 6, 7, 8A, 8B, 9A, and 9B.

Figure 5:
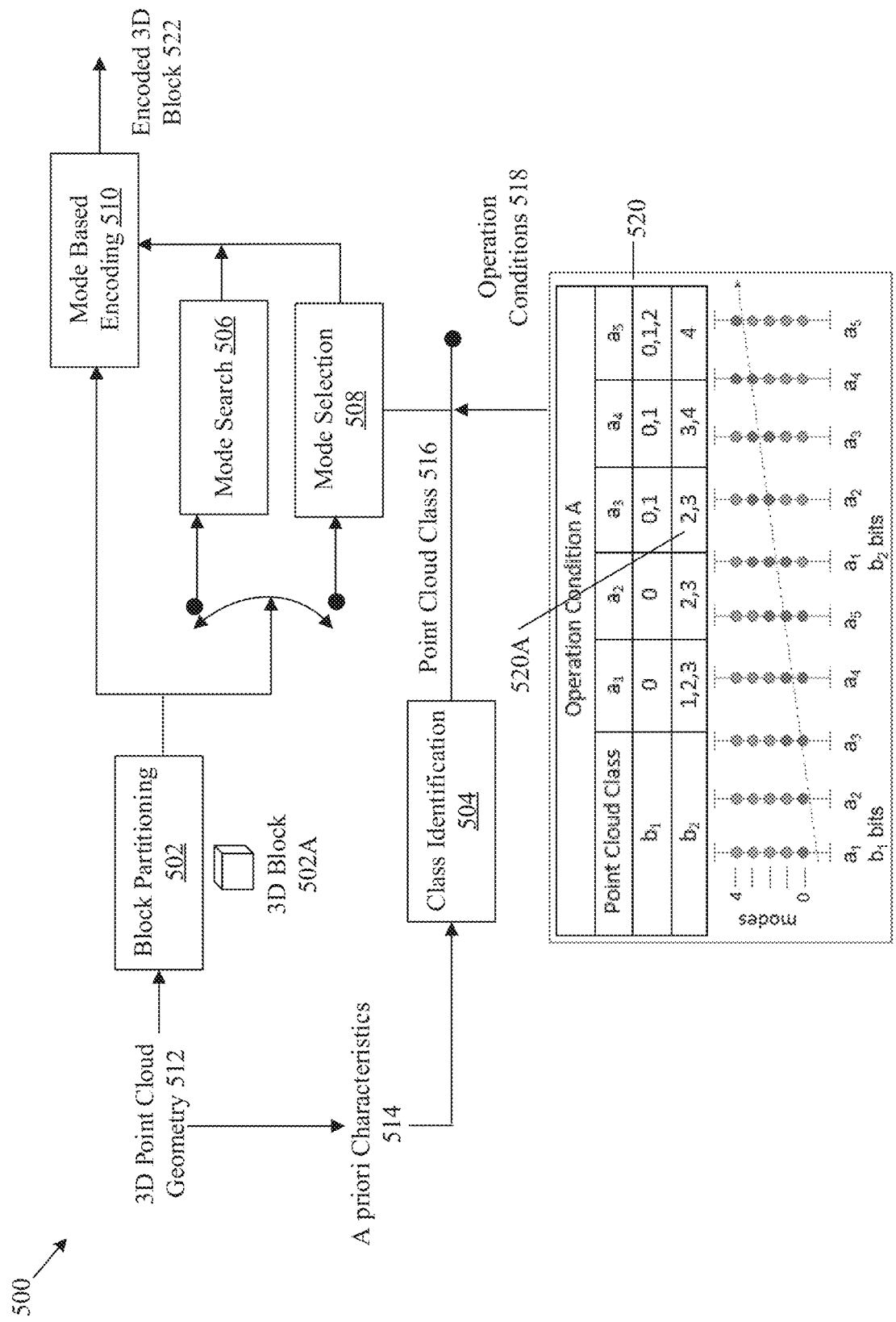
FIG. 5 is a diagram that illustrates an exemplary processing pipeline for adaptive mode selection for point cloud compression, in accordance with an embodiment of the disclosure.

FIG. 5 is a diagram that illustrates an exemplary processing pipeline for adaptive mode selection for point cloud compression, in accordance with an embodiment of the disclosure. FIG. 5 is explained in conjunction with elements from FIG. 1, FIG. 2, FIG. 3, and FIG. 4. With reference to FIG. 5, there is shown a processing pipeline 500 for adaptive mode selection for point cloud compression. In the processing pipeline 500, there is shown a sequence of operations that may start from 502 and end at 510. The sequence of operations may be executed by the circuitry 202 of the electronic device 102. There is also shown outputs obtained at the individual stages of operation.

At 502, a block partitioning operation may be executed. In the block partitioning operation, the processor 204 may be configured to partition an input point cloud geometry (such as, a 3D point cloud geometry 512) into a set of 3D blocks, such as, the set of 3D blocks 408A. The set of 3D blocks 408A may include a 3D block 502A. The block partitioning operation is described further, for example, in FIG. 4 (at 408). The encoding of the 3D block 502A, in an embodiment of the disclosure, is described next herein.

At 504, a class identification operation may be executed. In the class identification operation, the processor 204 may be configured to determine the class information associated with the 3D point cloud geometry 512 based on a-priori characteristics 514 associated with the 3D point cloud geometry 512. For example, the a-priori characteristics 514 may include a geometry bit-depth associated with the 3D point cloud geometry 512. Based on the a-priori characteristics 514, the processor 204 may determine the class information (for example, a point cloud class 516). By way of example, and not limitation, the class information may include at least one of a geometry bit-depth, a density, or a point distribution associated with the 3D point cloud geometry 512. Also, the processor 204 may receive one or more operational conditions, such as operation conditions 518. In an embodiment, the one or more operational conditions may be received via a user-input from a user associated with the electronic device 102. Alternatively, the one or more operational conditions may be pre-determined and stored in the memory 210. In such a case the processor 204 may retrieve the one or more operational conditions from the memory 210. The one or more operational conditions may be associated with the encoding stage of the 3D point cloud geometry 512 and may include a target rate-distortion cost associated with the 3D point cloud geometry 512. A rate-distortion cost may correspond to a distortion between original and reconstructed point cloud blocks. The rate-distortion cost may be determined based on a point-to-point distance or a plane-to-plane distance (or any other objective or subjective distortion metric) between corresponding points in an original point cloud block and a reconstructed point cloud block, and the estimated number of bits needed to encode the corresponding block.

The processor 204 may be configured to determine the mode decision information 412A based on the class information and the one or more operational conditions. For instance, the processor 204 may load a table (for example, a table 520) that may map a plurality of modes with classes and operational conditions. The processor 204 may search the table 520 using the class information and the one or more operational conditions to select one or more modes. Herein, each mode of the plurality of modes may correspond to a function that may be used to encode a 3D block, such as, the 3D block 502A. The table 520 may be generated and loaded prior to the encoding of the 3D block 502A. The generation of the table 520 is described further at 506. The searching of the table 520 to select the one or more modes is described further at 508.

At 506, a mode search operation may be executed. The mode search operation may be used to generate the table 520, prior to the encoding of the 3D blocks of the 3D point cloud geometry 512. In the mode search operation, the processor 204 may use the encoder 206 and the decoder 208 to determine an optimal mode from the plurality of modes to encode a 3D block of a calibration point cloud. The calibration point cloud may be a point cloud whose class and operational conditions may be known. The processor 204 may be configured to partition the calibration point cloud into a plurality of 3D blocks. The partitioning of the calibration point cloud may be similar to the partitioning of the 3D point cloud geometry 512, as described further, for example, at 502.

The encoder 206 may be further configured to encode each 3D block of the plurality of 3D blocks based on the plurality of modes to generate a plurality of encoded 3D blocks corresponding to each 3D block. Herein, each mode may correspond to a function that may be used to encode a 3D block. The function, which may be associated with a mode (e.g., a first mode), may be a Deep Neural Network (DNN) model (e.g., the DNN model-1 306A of the encoder-1 304A of FIG. 3) that may be trained to encode the 3D block to generate an encoded 3D block. In an embodiment, each mode of the plurality of modes may correspond to an alpha parameter of a focal loss function used in a training stage of the DNN model. Herein, the focal loss function may be configured to penalize a removal of non-empty voxels from the 3D block. By way of example, and not limitation, the focal loss function may be represented by equation (1), as follows:

$$FL(p_t) = -\alpha_t(1-p_t)^\gamma \log(p_t) \quad (1)$$

where,

FL( ) may represent the focal loss function;

$p_t$ may represent the DNN model's estimated probability of a voxel being occupied;

γ may represent a tunable focusing parameter (wherein γ≥0); and

α may represent the alpha parameter, which may be a balancing factor for the focal loss function (wherein 0<α≤1).

In an embodiment, the DNN models associated with each mode may be trained based on the attributes and geometry characteristics (such as density) of a 3D block of an input point cloud, e.g., the 3D point cloud 512. In such a case, each DNN model (which may be associated with a certain mode) may be trained using the 3D blocks that correspond to a different level of density. Thus, the different DNNs that represent the different modes may be derived from different training sets, each of which may correspond to a different density level. For example, the different density levels may include, but are not limited to, a solid level, a dense level, a sparse level, a scant level, and an insufficient level. Each of the density levels may correspond to a median of a distribution of a local density associated with each 3D point in a 3D block. The local density may be a number of neighborhood points within a spherical volume around each point, for instance.

By way of example, the plurality of modes may include 5 modes, such as a first mode (e.g., a mode '0'), a second mode (e.g., a mode '1'), a third mode (e.g., a mode '2'), a fourth mode (e.g., mode '3'), and a fifth mode (e.g., a mode '4'). Each mode may correspond to a certain value of the alpha parameter. As an example, the first mode (i.e., the mode '0') may correspond to a value of "0.5" of the alpha parameter. Similarly, the second mode (i.e., the mode '1') may correspond to a value of "0.6" of the alpha parameter. Further, each mode may correspond to a certain density level of the 3D point cloud 512. As an example, the first mode (i.e., the mode '0') may correspond to a density level "solid". Similarly, the second mode (i.e., the mode '1') may correspond to a density level "dense". Exemplary values of the alpha parameter for each of the plurality of modes are illustrated in Table 1 and exemplary values of density level for each of the plurality of modes are illustrated in Table 2, as follows:

TABLE 1

Exemplary values of the alpha parameter for each mode

| Mode | Alpha Parameter |
|---|---|
| First mode (i.e., the mode '0') | 0.5 |
| Second mode (i.e., the mode '1') | 0.6 |
| Third mode (i.e., the mode '2') | 0.7 |
| Fourth mode (i.e., the mode '3') | 0.8 |
| Fifth mode (i.e., the mode '4') | 0.9 |

TABLE 2

Exemplary values of the density level for each mode

| Mode | Density Level |
|---|---|
| First mode (i.e., the mode '0') | Solid |
| Second mode (i.e., the mode '1') | Dense |
| Third mode (i.e., the mode '2') | Sparse |
| Fourth mode (i.e., the mode '3') | Scant |
| Fifth mode (i.e., the mode '4') | Insufficient |

With reference to Tables 1 and 2, the encoder 206 may encode the plurality of 3D blocks of the calibration point cloud based on each of the five modes. Each 3D block may be encoded to generate five encoded 3D blocks. The five encoded 3D blocks may include a first encoded 3D block (that may be encoded based on the first mode), a second encoded 3D block (that may be encoded based on the second mode), . . . and a fifth encoded 3D block (that may be encoded based on the fifth mode). Each 3D block of the calibration point cloud may be encoded five times (i.e., once per mode) to generate five versions (i.e., one encoded block version per mode) of the encoded 3D block. It should be noted that data provided in Tables 1 and 2 may merely be taken as experimental data and should not be construed as limiting the present disclosure.

The encoder 206 may be configured to determine a rate-distortion cost associated with each of the generated plurality of encoded 3D blocks. The rate-distortion cost may correspond to a distortion between an original point cloud block and a reconstructed point cloud block. The rate-distortion cost may be determined based on a point-to-point distance or a plane-to-plane distance (or any other objective or subjective distortion metric) between corresponding points in the original point cloud and the reconstructed point cloud, and the estimated number of bits needed to encode the corresponding block.

The encoder 206 may determine statistical information that may indicate, for each mode of the plurality of modes, a fraction of the generated plurality of encoded 3D blocks for which the rate-distortion cost may be minimum. For example, the plurality of modes may include the mode '0', the mode '1', the mode '2', the mode '3', and the mode '4'. From among all available modes (i.e., the modes '0', '1', '2', '3', and '4'), the encoder 206 may determine that a lowest rate-distortion cost for 90% of the encoded 3D blocks of the calibration point cloud is associated with the mode '0'. Similarly, it may be determined that a lowest rate-distortion cost for 5% of the encoded 3D blocks of the calibration point cloud may be associated with the mode '1'. For each mode, the statistical information may include such fractions of the generated plurality of encoded 3D blocks for which the rate distortion cost may be minimum. Exemplary statistical information for the plurality of modes is illustrated in Table 3, as follows:

TABLE 3

Exemplary statistical information for each mode

| Mode | Fraction of the encoded 3D blocks for which the rate distortion cost is a minimum |
|---|---|
| First mode (i.e., the mode '0') | 0.9 (i.e., 90%) |
| Second mode (i.e., the mode '1') | 0.05 (i.e., 5%) |
| Third mode (i.e., the mode '2') | 0.02 (i.e., 2%) |
| Fourth mode (i.e., the mode '3') | 0.02 (i.e., 2%) |
| Fifth mode (i.e., the mode '4') | 0.01 (i.e., 1%) |

Data provided in Table 3 should merely be taken as experimental data and should not be construed as limiting the present disclosure.

The encoder 206 may determine, from the plurality of encoded 3D blocks, a subset of encoded 3D blocks for which for which the fraction of the plurality of encoded 3D blocks is above a threshold, based on the determined statistical information. For example, with reference to Table 3, for 90% of the plurality of 3D blocks of the calibration point cloud, the mode '0' may be an optimum mode. Further, for 5% of the plurality of 3D blocks, the mode '1' may be an optimum mode. In such case, if the threshold is 94%, the subset of encoded 3D blocks may be determined as the mode '0' and the mode '1', as the total percentage of encoded 3D blocks for which the modes '0' and '1' are optimum modes is 95% (which is greater than the threshold).

The encoder 206 may further determine, from the plurality of modes, a subset of modes that may be used in the generation of the subset of encoded 3D blocks. The subset of modes may lead to a relatively lesser distortion cost when used to encode a 3D block as compared to distortion costs corresponding to other modes of the plurality of modes. Further, the subset of modes may be optimum modes to encode a statistically significant or majority (e.g., 95%) of the plurality of 3D blocks of the calibration point cloud. Thus, the subset of modes may be more optimum modes to encode the 3D block of the calibration point cloud than other modes of the plurality of modes. The subset of modes may be selected as modes corresponding to the class and operational conditions associated with the calibration point cloud. The selected modes may be inserted into the table as a record that corresponds to a class and operational conditions associated with the calibration point cloud.

The encoder 206 may generate the table (e.g., the table 520) based on the determined subset of modes, classes (for example, including the class of the calibration point cloud), and operational conditions. For example, the encoder 206 may select different operational conditions (i.e., target rate-distortion costs) and determine the subset of modes for each operational condition, for the calibration point cloud of the particular class, as described in the aforementioned. The encoder 206 may repeat the process of the determination of the subset of modes for a set of calibration point clouds of different classes under various operational conditions. The encoder 206 may determine statistical information associated with mode usage for different point cloud classes and different operational conditions. The statistical information may be indicative of statistics associated with the subset of 3D blocks that may be encoded with the subset of modes. The encoder 206 may determine the subset of modes as an entry corresponding to the class and the operational condition in the table 520 based on the statistical information. In an example, if the statistical information indicates that the subset of 3D blocks includes 90% or more 3D blocks from the plurality of 3D blocks, the encoder 206 may determine the subset of modes (that may be associated with the subset of 3D blocks) as an entry corresponding to the particular class of the calibration point cloud and the operational condition. As the subset of modes may be associated with 90% or more 3D blocks from the plurality of 3D blocks, the encoder 206 may be required to check only the subset of modes to encode any 3D block of a 3D point cloud geometry with the same class and under the same operational conditions. Thus, a full search (that may require encoding of a 3D block based on each of the plurality of modes) may not be required to be executed to determine a mode suitable to encode the 3D block of a 3D point cloud geometry, thereby saving time and computations. The encoder 206 may search the table 520 using the class information of the 3D point cloud geometry 512 and the operational conditions to select the one or more modes.

As shown in FIG. 5, the table 520 may include entries of the subset of modes corresponding to different point cloud classes and different operational conditions. For example, the various point cloud classes may include a class "b1" (such as 10-bit depth) and a class "b2" (such as 11-bit depth). Further, operational conditions may correspond to target rate-distortion costs and may include five operational conditions, such as, "a1", "a2", "a3", "a4", and "a5". As an example, a first subset of modes 520A corresponding to the operational condition "a3" and the point cloud class "b2" may include the mode '2' and the mode'3'. It should be noted that data provided in the table 520 may merely be taken as experimental data and should not be construed as limiting the present disclosure.

At 508, a mode selection operation may be executed. In the mode selection operation, the encoder 206 may be configured to select one or more modes for the 3D block 502A from the plurality of modes, based on the mode decision information. Herein, the mode decision information may include the class information (i.e., the point cloud class 516) and the operation conditions 518 associated with the 3D point cloud geometry. The encoder 206 may search the table 520 based on the point cloud class 516 and the operation conditions 518 to select the one or more modes, as described herein. With reference to the table 520, the encoder 206 may select the first subset of modes 520A (i.e., the mode '2' and the mode '3') as the one or more modes to encode the 3D block 502A, in case the operational condition 518 is "a3" and the point cloud class 516 is "b2".

At 510, a mode-based encoding operation may be executed. In the mode-based encoding operation, the encoder 206 may encode the 3D block 502A based on the selected one or more modes to generate an encoded 3D block 522. In case the selected one or more modes includes a single mode (e.g., the mode '4'for the operational condition "a5" and the point cloud class "b2"), the single mode itself may correspond to the optimum mode, which may be used to encode the 3D block 502A. In another scenario, in case the selected one or more modes includes multiple modes, the encoder 206 may encode the 3D blocks based on each of the one or more selected modes to determined one or more encoded 3D blocks. For example, in case the one or more modes include 3 modes, the encoder 206 may encode each 3D blocks to generate 3 encoded 3D block versions (one for each mode). The encoder 206 may determine rate-distortion costs associated with each of the selected one or more modes. The encoder 206 may determine a mode of the selected one or more modes as an optimal mode for the encoding stage, based on a determination that a rate-distortion cost associated with the mode corresponds to a minimum of the determined rate-distortion costs. In other words, the encoder 206 may compare the determined rate-distortion costs and select a mode with the least rate-distortion cost as the optimum mode, which may be used to encode the 3D block 502A.

For example, if the selected one or more modes are the first subset of modes 520A, then the encoder 206 may encode the 3D block 502A based on the mode '2' and based on the mode '3' to determine a first encoded 3D block and a second encoded 3D block, respectively. The encoder 206 may determine a first rate-distortion cost for the first encoded 3D block and a second rate-distortion cost for the second encoded 3D block. In an embodiment, the encoder 206 may compare the first rate-distortion cost with the second rate-distortion cost and determine the mode corresponding to the lower of the two rate-distortion costs as the optimal mode. For example, the encoder 206 may determine the optimal mode as the mode '2', in case the first rate-distortion cost associated with the first encoded 3D block (encoded using the mode '2') is less than the second rate-distortion cost associated with second encoded 3D block (encoded using the mode '3'). In other words, the encoder 206 may determine the optimal mode from the selected one or more modes (such as modes '2' and '3') as one (e.g., the mode '2') that minimizes the rate distortion cost associated with the 3D block, when encoded by use of the particular mode (i.e., the mode '2').

Once the optimal mode is determined, the encoder 206 may encode the 3D block 502A based on the determined optimal mode to generate the encoded 3D block 522. In an embodiment, the encoder 206 may use a DNN model corresponding to the determined optimal mode to encode the 3D block 502A. For example, if the mode '2' is determined as the optimal mode, then the encoder 206 may use a DNN model (for example, the DNN model-N 306N) corresponding to the mode '2' to encode the 3D block 502A. Herein, the DNN model-N 306N may be a DNN model that may be trained based on the focal loss function with an alpha parameter value of 0.7, as the alpha parameter value corresponding to the mode '2' may be 0.7. In another example, the DNN model-N 306N may be a DNN model that may be trained on a training set including 3D blocks of a point cloud with a "sparse" density level. If the selected one or more modes includes two modes (for example, the mode '2' and the mode '3') and the plurality of modes include 5 different modes, then the encoder 206 may be required to execute two encoding operations and two decoding operations to encode each 3D block. Conventional solutions that implement full mode search may require the encoder to execute five encoding operations and five decoding operations to encode each 3D block. Using the table 520, the disclosed electronic device 102 may achieve a coding efficiency gain of 2.5 times (i.e., (5+5)/(2+2)) over that offered by conventional solutions.

Figure 6:
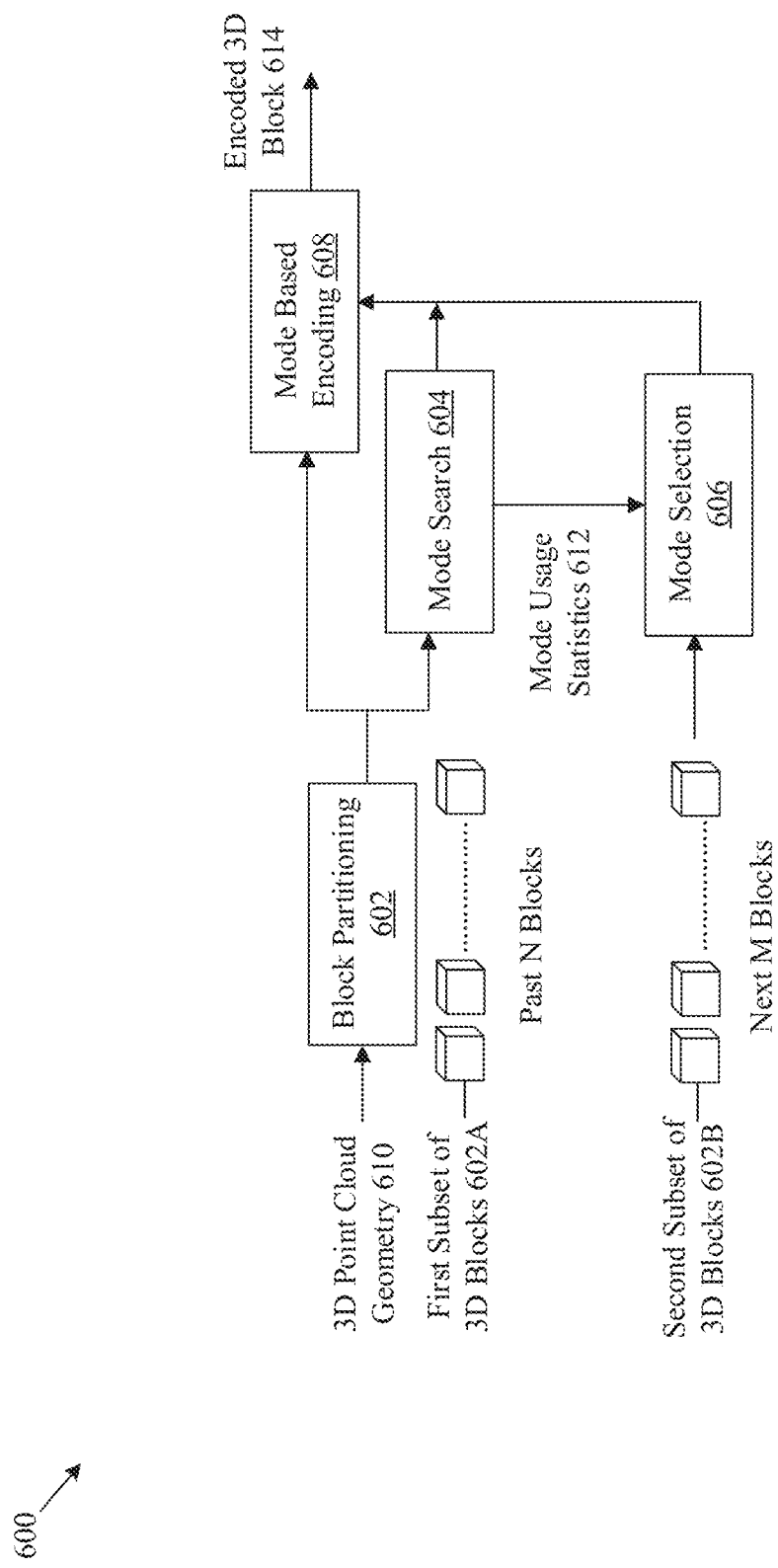
FIG. 6 is a diagram that illustrates an exemplary processing pipeline for adaptive mode selection for point cloud compression, in accordance with an embodiment of the disclosure.

FIG. 6 is a diagram that illustrates an exemplary processing pipeline for adaptive mode selection for point cloud compression, in accordance with an embodiment of the disclosure. FIG. 6 is explained in conjunction with elements from FIG. 1, FIG. 2, FIG. 3, FIG. 4, and FIG. 5. With reference to FIG. 6, there is shown a processing pipeline 600 for adaptive mode selection for point cloud compression. In the processing pipeline 600, there is shown a sequence of operations that may start from 602 and end at 608. The sequence of operations may be executed by the circuitry 202 of the electronic device 102. There is also shown outputs obtained at the individual stages of operation.

At 602, a block partitioning operation may be executed. In the block partitioning operation, the encoder 206 may be configured to partition an input point cloud geometry (such as, a 3D point cloud geometry 610) into a set of 3D blocks, such as, the set of 3D blocks 408A. The set of 3D blocks 408A may include a 3D block 416. The block partitioning operation is described further, for example, in FIG. 4 (at 408).

In an embodiment, the encoder 206 may be configured to determine subsets of the set of 3D blocks 408A, based on a scan of the set of 3D blocks 408A in a defined scan order. For example, the set of 3D blocks 408A may be scanned according to a Morton order (or a Z-order). The Morton order for the set of 3D blocks 408A may map multi-dimensional coordinate values into 1D while preserving locality of each of the plurality of voxels 406A in the set of 3D blocks 408A. The Morton order in the 3D space may be generated by interleaving a binary representation of the geometrical information (i.e., the 3D coordinates) of the plurality of voxels 406A. In an embodiment, coordinates of origins of each of the plurality of voxels 406A in the set of 3D blocks 408A may be sorted based on the Morton order for the encoding stage 410. Further, during a decoding stage, at a decoder, the plurality of voxels 406A in the set of 3D blocks 408A may be re-sorted back to obtain a reconstructed point cloud.

Based on the defined scan order, the encoder 206 may determine a first subset of 3D blocks 602A and a second subset of 3D blocks 602B from the subsets of the set of 3D blocks 408A. That is, the set of 3D blocks 408A may include the first subset of 3D blocks 602A and the second subset of 3D blocks 602B. Herein, the second subset of 3D blocks 602B may succeed the first subset of 3D blocks 602A in accordance with the scan order. For example, the first subset of 3D blocks 602A may be a subset of 'N' consecutive 3D blocks in the scan order. Further, the second subset of 3D blocks 602B may be a subset of 'M' consecutive 3D blocks in the scan order.

The values of 'M' and 'N' may vary during the encoding of the set of 3D blocks 408A based on local characteristics of the encoding operation. The local characteristics may include, for example, an increase in reconstruction distortion beyond a certain threshold value. In an embodiment, the second subset of 3D blocks 602B may include the 3D block 416. The encoding of the 3D block 416 is described herein.

At 604, a mode search operation may be executed. In the mode search operation, the encoder 206 may be configured to encode each 3D block of the first subset (i.e., the first subset of 3D blocks 602A) of the determined subsets, based on each of the plurality of modes to generate a plurality of encoded 3D blocks. For example, with reference to the Table 1, the encoder 206 may encode each 3D block of the first subset of 3D blocks 602A based on the five modes (such as mode '0', mode '1', mode '2', mode '3', and mode '4') to generate five corresponding encoded 3D blocks. The encoder 206 may be further configured to determine a rate-distortion cost associated with each encoded 3D block of the plurality of encoded 3D blocks. The encoder 206 may be further configured to determine mode usage statistics (e.g., mode usage statistics 612) associated with the first subset (i.e., the first subset of 3D blocks 602A) based on each determined rate-distortion cost associated with each encoded 3D block of the plurality of encoded 3D blocks. The mode usage statistics 612 may include information associated with an optimal mode selected for the first subset of 3D blocks 602A. For example, the mode usage statistics 612 may indicate that the mode '2' and the mode '3' may be optimal modes for a certain percentage of 3D blocks in the first subset of 3D blocks 602A. Herein, the mode-related information may include the determined mode usage statistics 612 associated with the first subset of 3D blocks 602A.

At 606, a mode selection operation may be executed. In the mode selection operation, the encoder 206 may be configured to select the one or more modes for the second subset of 3D blocks 602B that may include the 3D block 416. The selection of the one or more modes may be based on the mode decision information, which includes the mode-related information in the form of the mode usage statistics 612. For example, in case the mode usage statistics indicates that mode '2' and mode'3' are optimal modes for 90% or more of the 3D blocks from the first subset of 3D blocks 602A, the encoder 206 may select mode '2' and mode '3' as the one or more modes for the second subset of 3D blocks 602B.

At 608, a mode-based encoding operation may be executed. In the mode-based encoding operation, the encoder 206 may encode the 3D block 416 based on the selected one or more modes to generate an encoded 3D block 614. In an embodiment, the encoder 206 may encode the 3D block 416 based on each of the one or more selected modes to determine one or more encoded 3D blocks. Thereafter, the encoder 206 may be configured to determine a rate-distortion cost associated with each of the determined one or more encoded 3D blocks. The encoder 206 may determine a mode of the selected one or more modes as an optimal mode for the encoding stage, based on a determination that the rate-distortion cost associated with the determined mode is below a threshold. The mode-based encoding operation is described further, for example, in FIG. 5 (at 510).

In case the selected one or more modes includes two modes (for example, the mode '2' and the mode'3') and the plurality of modes include 5 modes, the encoder 206 may be required to only execute 2*M encoding operations and 2*M decoding operations to encode each 3D block. The table 520 may not be required to be generated in this case. In the conventional systems, a total of 5*(M+N) encoding and decoding operations may be required as each of the M+N 3D blocks may be encoded and decoded with all of the 5 modes. In case of the current embodiment of the disclosure, 5*N encoding and decoding operations may be required to encode the N blocks in the calibration process and 2*M encoding and decoding operations may be required to encode the M blocks that follow the N blocks (which may be used in the calibration process). The coding efficiency gain may be determined as 5*(M+N)/(2*M+5*N). For example, if M and N have the same value (i.e., M=N), for instance, then the coding efficiency gain may be 5*2/7 (i.e., 10/7-1.43).

In such case only two candidate modes may be selected and M=N.

Figure 7:
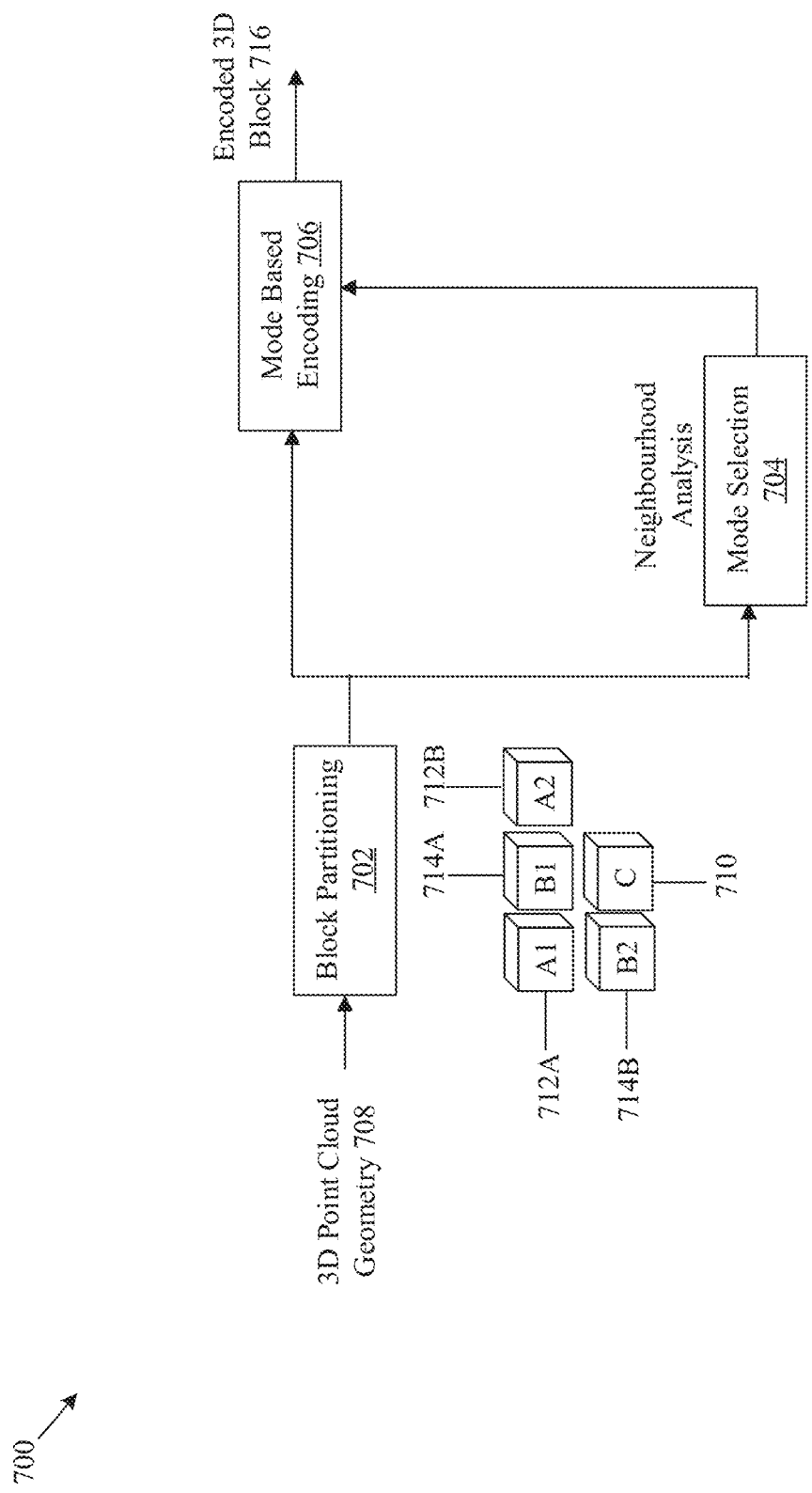
FIG. 7 is a diagram that illustrates an exemplary processing pipeline for adaptive mode selection for point cloud compression, in accordance with an embodiment of the disclosure.

FIG. 7 is a diagram that illustrates an exemplary processing pipeline for adaptive mode selection for point cloud compression, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown a processing pipeline 700 for adaptive mode selection for point cloud compression. In the processing pipeline 700, there is shown a sequence of operations that may start from 702 and end at 706. The sequence of operations may be executed by the circuitry 202 of the electronic device 102. There is also shown outputs obtained at the individual stages of operation.

At 702, a block partitioning operation may be executed. In the block partitioning operation, the processor 204 may be configured to partition an input point cloud geometry (such as, a 3D point cloud geometry 708) into a set of 3D blocks, such as, the set of 3D blocks 408A. The set of 3D blocks 408A may include a 3D block 710 (e.g., a block "C", as shown in FIG. 7). The block partitioning operation is described further, for example, in FIG. 4 (at 408).

The processor 204 may be further configured to determine, from the set of 3D blocks 408A, a subset of 3D blocks that is in a neighborhood of the 3D block 710, based on a spatial arrangement of the set of 3D blocks 408A in the 3D point cloud geometry 708. For example, a subset of four 3D blocks may lie in the 3D neighborhood of the 3D block 710 (i.e., the block "C". As shown in FIG. 7, the subset of four 3D blocks may include a first 3D block 712A (e.g., a block "A1"), a second 3D block 712B (e.g., a block "A2"), a third 3D block 714A (e.g., a block "B1"), and a fourth 3D block 714B (e.g., a block "B2"). The encoding of the 3D block 710 is described herein.

At 704, a mode selection operation may be executed. In the mode selection operation, the processor 204 may be configured to determine a usage of the one or more modes to encode each 3D block of the subset of 3D blocks to generate a respective encoded 3D block. In an embodiment, the usage of the one or more modes to encode each 3D block of the subset of 3D blocks may be pre-determined based on the encoding of the subset of 3D blocks prior to the 3D block 710. As an example, the one or more modes used to encode both the first 3D block 712A and the second 3D block 712B may be the mode '2' and the mode '3'. Further, the one or more modes used to encode both the third 3D block 714A and the fourth 3D block 714B may be the mode '3' and the mode '4'.

The processor 204 may be configured to execute a neighborhood analysis operation on each 3D block of the subset. The neighborhood analysis operation may include a determination of a relative position of each 3D block of the subset in a neighborhood of the 3D block 710. As shown, for example, based on the neighborhood analysis operation, the processor 204 may determine that an edge of both the first 3D block 712A and the second 3D block 712B may be directly adjacent to an edge of the 3D block 710. Further, the processor 204 may determine that a face of both third 3D block 714A and the fourth 3D block 714B may be directly adjacent to a face of the 3D block 710. Based on the neighborhood analysis operation, it may be determined that both the third 3D block 714A and the fourth 3D block 714B are closer to the 3D block 710 as compared to either of the first 3D block 712A or the second 3D block 712B.

By way of an example, and not limitation, based on the neighborhood analysis operation, the processor 204 may select a frequently used mode amongst the 3D blocks (such as, the first 3D block 712A, the second 3D block 712B, the third 3D block 714A, and the fourth 3D block 714B) in the neighborhood of the 3D block 710 to encode the 3D block 710. In case, there is no most frequent mode, a default mode associated with the closest 3D block (e.g., the third 3D block 714A) may be selected to encode the 3D block 710. In another example, the processor 204 may select a mode of the closest 3D block (e.g., the third 3D block 714A) in the neighborhood of the 3D block 710 to encode the 3D block 710. In case there are two or more closest 3D blocks (such as, the third 3D block 714A and the fourth 3D block 714B) in the neighborhood of the 3D block 710, a mode of one of such closest 3D blocks may be randomly selected to encode the 3D block 710. In another example, the processor 204 may execute a mode search operation (similar to 506 of FIG. 5 and 604 of FIG. 6) to select a mode out of the modes of all the neighboring 3D blocks (or the neighboring closest 3D blocks) that corresponds to a minimum rate-distortion cost with respect to the other modes. The selected mode (i.e., the mode with the minimum rate-distortion cost characteristic) may be used to encode the 3D block 710.

The processor 204 may select an optimum mode for the 3D block 710 based on the usage of a mode to encode each 3D block of the subset of 3D blocks to generate a respective encoded 3D block. For instance, as the third 3D block 714A and the fourth 3D block 714B may be closer to the 3D block 710, the encoder 206 may select the optimum mode to be used to encode the 3D block 710 as the mode used to encode each of the third 3D block 714A and the fourth 3D block 714B. Specifically, both the third 3D block 714A and the fourth 3D block 714B may be encoded based on the mode '4'.

At 706, a mode-based encoding operation may be executed. In the mode-based encoding operation, the encoder 206 may encode the 3D block 710 based on the selected one or more modes to generate an encoded 3D block 716. In an embodiment, the selected one or more modes may include only one mode. In such case, rate-distortion based optimization may not be required and the encoder 206 may directly encode the 3D block 710 based on the single selected mode. As an example, in case the selected one or more modes includes a single mode (for example, mode '4') and the plurality of modes include 5 modes, the encoder 206 may be required to execute only one encoding operation to encode each 3D block. Further, the table 520 may not be required to be generated herein. However, in conventional systems, as the plurality of modes includes 5 modes, the encoder may be required to execute 5 encoding operations and 5 decoding operations to encode each 3D block. Thus, a coding efficiency gain of 10 times (i.e., (5+5)/1) may be achieved by the disclosed electronic device 102 as compared to conventional systems.

Figure 8A:
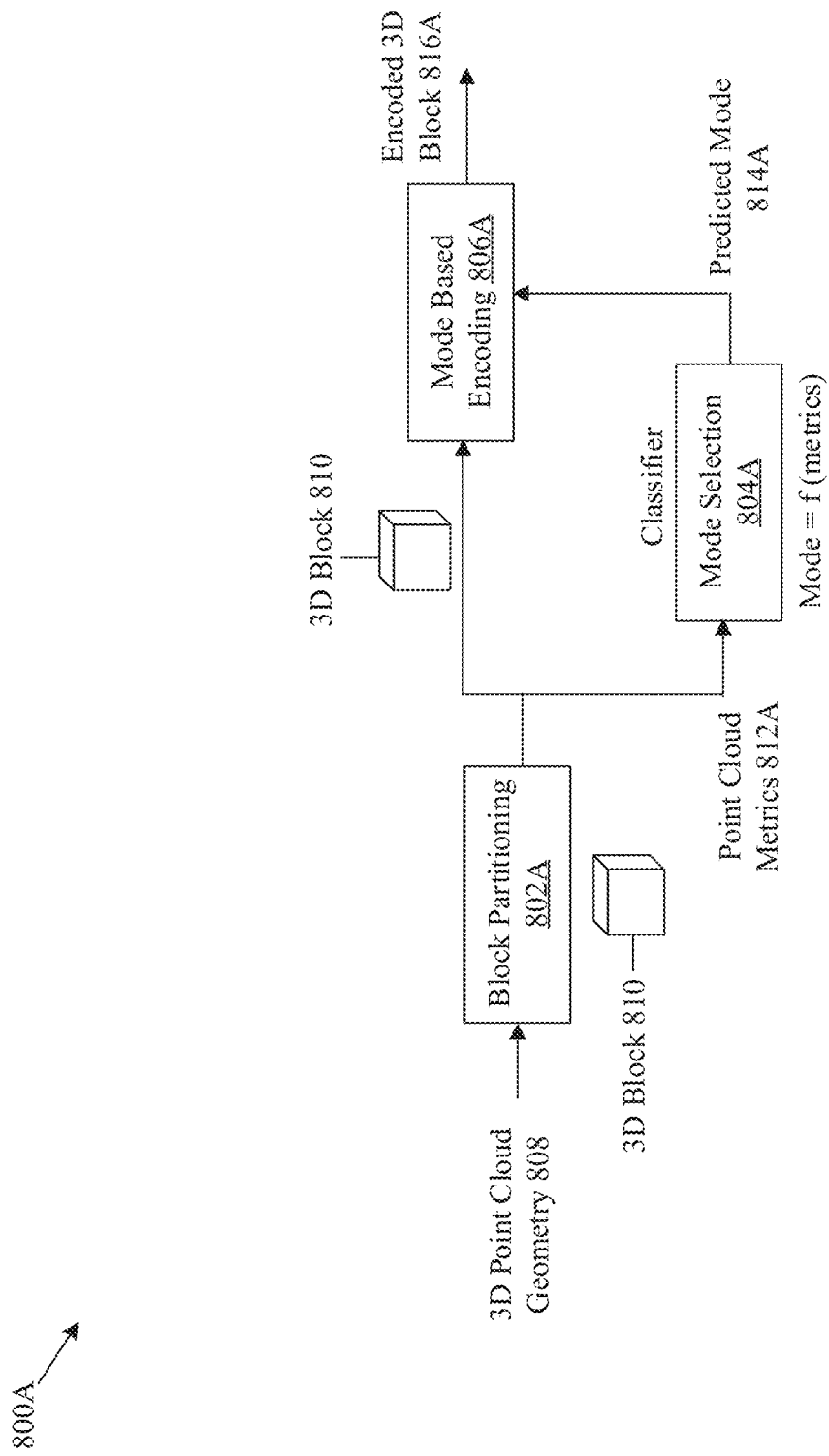
FIG. 8A is a diagram that illustrates an exemplary processing pipeline for adaptive mode selection for point cloud compression, in accordance with an embodiment of the disclosure.

FIG. 8A is a diagram that illustrates an exemplary processing pipeline for adaptive mode selection for point cloud compression, in accordance with an embodiment of the disclosure. FIG. 8A is explained in conjunction with elements from FIG. 1, FIG. 2, FIG. 3, FIG. 4, FIG. 5, FIG. 6, and FIG. 7. With reference to FIG. 8A, there is shown a processing pipeline 800A for adaptive mode selection for point cloud compression. In the processing pipeline 800A, there is shown a sequence of operations including 802A, 804A, and 806A. The sequence of operations may be executed by the circuitry 202 of the electronic device 102. There is also shown outputs obtained at the individual stages of operation.

At 802A, a block partitioning operation may be executed. In the block partitioning operation, processor 204 may be configured to partition an input point cloud geometry (such as a 3D point cloud geometry 808) into a set of 3D blocks, such as the set of 3D blocks 408A. The 3D point cloud geometry 808 may include information associated with the 3D point cloud geometry 112. The set of 3D blocks 408A may include a 3D block 810. The block partitioning operation is described further, for example, in FIG. 4 (at 408).

The processor 204 may be further configured to determine point cloud metrics (e.g., point cloud metrics 812A) that includes the class information associated with the 3D block 810. In some cases, the point cloud metrics 812A may include, for example, a density or a point distribution associated with the 3D block 810. The encoding of the 3D block 810 is described herein.

At 804A, a mode selection operation may be executed. In the mode selection operation, the processor 204 may be configured to select the one or more modes (e.g., a predicted mode 814A) for the 3D block 810 based on an application of a classifier model on the point cloud metrics 812A. In accordance with an embodiment, the classifier model may be a machine learning model that may be trained on a task of mode prediction. A training dataset for the mode prediction task may include point cloud metrics associated with 3D blocks of point clouds and one or more modes that may be used to encode the corresponding 3D blocks. In an embodiment, the classifier model may be stored in the memory 210 and used by the processor 204 to select the one or more modes for the 3D block 810. In accordance with another embodiment, the classifier model may be a neural network model. The neural network model may be similar to the DNN models described further, for example, in FIG. 3.

At 806A, a mode-based encoding operation may be executed. In the mode-based encoding operation, the encoder 206 may encode the 3D block 810 based on the selected one or more modes (e.g., the predicted mode 814A) to generate an encoded 3D block 816A. In an embodiment, the selected one or more modes may include only one mode. In such a case, rate-distortion based optimization may not be required and the encoder 206 may directly encode the 3D block 810 based on the single selected mode. As an example, in case the selected one or more modes includes a single mode (for example, mode '4') and the plurality of modes include 5 modes, the encoder 206 may be required to execute only one encoding operation to encode each 3D block. The table 520 may not be required in this case. In conventional solutions that implement full mode search for all modes (e.g., 5 modes), the encoder may execute 5 encoding operations and 5 decoding operations to encode each 3D block. Thus, the disclosed electronic device 102 may achieve a coding efficiency gain of more than 5 (i.e., (5*E+5*D)/E or 5+5*(D/E)) over that offered by conventional solutions, if encoding and decoding complexities are different. Whereas, if encoding and decoding complexity are equal, the disclosed electronic device 102 may achieve a coding efficiency gain of 10 over that offered by conventional solutions. E and D represent encoding complexity and decoding complexity, respectively.

FIG. 8B is a diagram that illustrates an exemplary processing pipeline for adaptive mode selection for point cloud compression, in accordance with an embodiment of the disclosure. FIG. 8B is explained in conjunction with elements from FIG. 1, FIG. 2, FIG. 3, FIG. 4, FIG. 5, FIG. 6, FIG. 7, and FIG. 8A. With reference to FIG. 8B, there is shown a processing pipeline 800B for adaptive mode selection for point cloud compression. In the processing pipeline 800B, there is shown a sequence of operations including 802B, 804B, and 806B. The sequence of operations may be executed by the circuitry 202 of the electronic device 102. There is also shown outputs obtained at individual stages of operation.

At 802B, a block partitioning operation may be executed. In the block partitioning operation, the processor 204 may be configured to partition an input point cloud geometry (such as, the 3D point cloud geometry 808) into a set of 3D blocks, such as, the set of 3D blocks 408A. The set of 3D blocks 408A may include the 3D block 810. The block partitioning operation is described further, for example, in FIG. 4 (at 408).

The processor 204 may be further configured to determine a subset of 3D blocks (for example, a subset of 3D blocks 818) in a neighborhood of the 3D block 810. The encoder 206 may be further configured to determine point cloud metrics (e.g., point cloud metrics 812B) including the class information associated with the 3D block 810 and the subset of 3D blocks 818 in the neighborhood of the 3D block 810 of the 3D point cloud geometry 808. For example, the point cloud metrics 812B may include, but is not limited to, a density, or a point distribution associated with the 3D block 810 and the subset of 3D blocks 818. The encoding of the 3D block 810, in an embodiment of the disclosure, is described next herein.

At 804B, a mode selection operation may be executed. In the mode selection operation, the processor 204 may be configured to select the one or more modes (e.g., a predicted mode 814B) for the 3D block 810 based on an application of a classifier model on the point cloud metrics 812B. In an embodiment, the classifier model may be a machine learning model that may be trained on a task of mode prediction. In an example, the classifier model may be a neural network model. A training dataset for the mode prediction task may include information associated with point cloud metrics associated with 3D blocks of point clouds and one or more modes that may encode the corresponding 3D blocks. In an embodiment, the classifier model may be stored in the memory 210 and used by the encoder 206 to select the one or more modes for the 3D block 810. Details related to the classifier model are described further, for example, in FIG. 8A.

At 806B, a mode-based encoding operation may be executed. In the mode-based encoding operation, the encoder 206 may encode the 3D block 810 based on the selected one or more modes (e.g., the predicted mode 814B) to generate an encoded 3D block 816B. In an embodiment, the selected one or more modes may include only one mode. In such case, rate-distortion based optimization may not be required and the encoder 206 may directly encode the 3D block 810 based on the single selected mode. As an example, in case the selected one or more modes includes a single mode (for example, mode '4') and the plurality of modes include 5 modes, the encoder 206 may be required to execute only one encoding operation to encode each 3D block. Further, the table 520 may not be required to be generated herein. However, in conventional systems, as the plurality of modes includes 5 modes, the encoder may be required to execute 5 encoding operations and 5 decoding operations to encode each 3D block. Thus, the disclosed electronic device 102 may achieve a coding efficiency gain of more than 5 (i.e., (5*E+5*D)/E or 5+5*(D/E)) over that offered by conventional solutions, if encoding and decoding complexities are different. Whereas, if encoding and decoding complexity are equal, the disclosed electronic device 102 may achieve a coding efficiency gain of 10 over that offered by conventional solutions. E and D represent encoding complexity and decoding complexity, respectively.

Figure 9A:
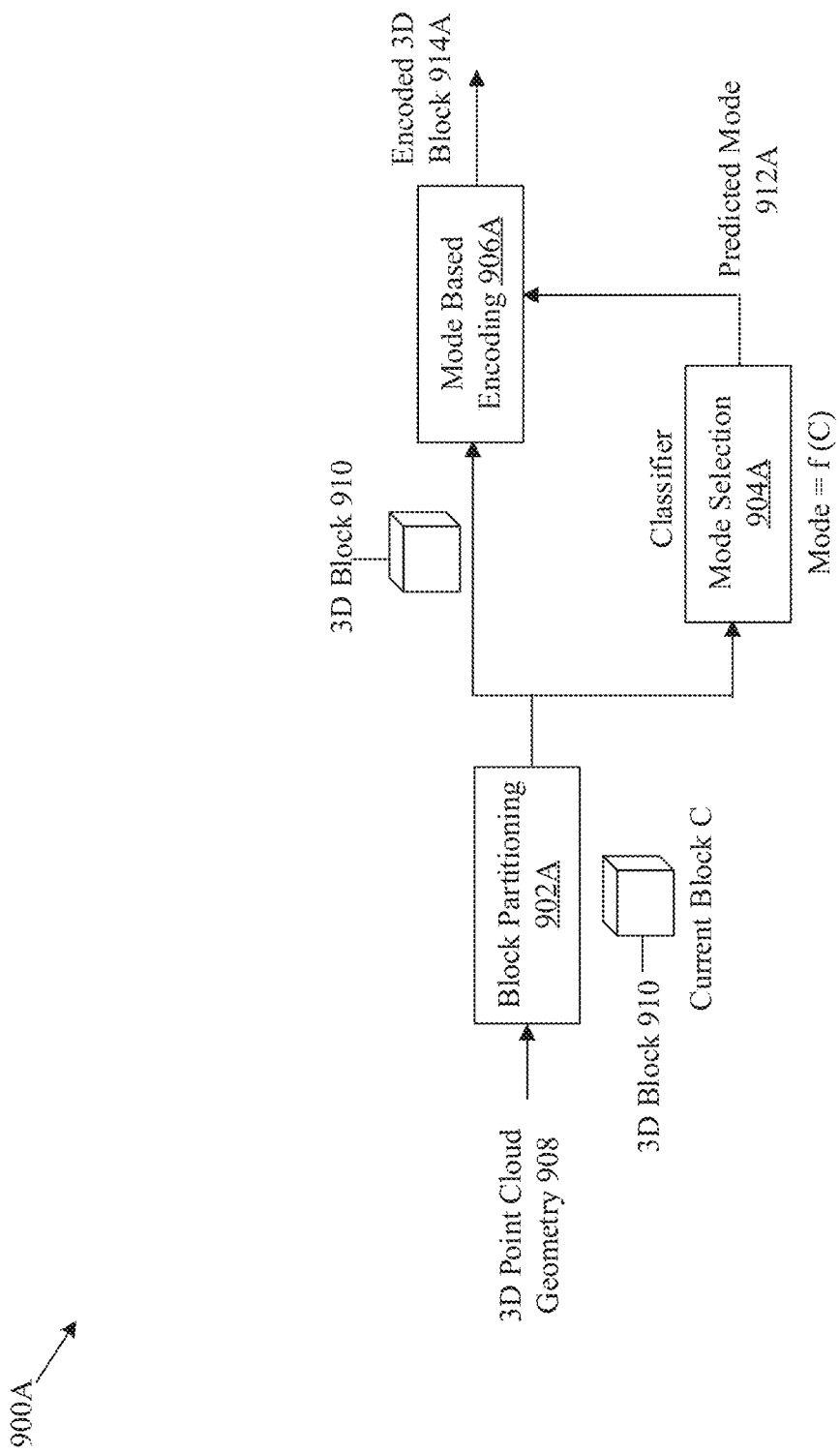
FIG. 9A is a diagram that illustrates an exemplary processing pipeline for adaptive mode selection for point cloud compression, in accordance with an embodiment of the disclosure.

FIG. 9A is a diagram that illustrates an exemplary processing pipeline for adaptive mode selection for point cloud compression, in accordance with an embodiment of the disclosure. FIG. 9A is explained in conjunction with elements from FIG. 1, FIG. 2, FIG. 3, FIG. 4, FIG. 5, FIG. 6, FIG. 7, FIG. 8A, and FIG. 8B. With reference to FIG. 9A, there is shown a processing pipeline 900A for adaptive mode selection for point cloud compression. In the processing pipeline 900A, there is shown a sequence of operations including 902A, 904A, and 906A. The sequence of operations may be executed by the circuitry 202 of the electronic device 102. There is also shown outputs obtained at the individual stages of operation.

At 902A, a block partitioning operation may be executed. In the block partitioning operation, the processor 204 may be configured to partition an input point cloud geometry (such as, a 3D point cloud geometry 908) into a set of 3D blocks, such as, the set of 3D blocks 408A. The set of 3D blocks 408A may include a 3D block 910 (e.g., a current 3D block "C"). The block partitioning operation is described further, for example, in FIG. 4 (at 408). The encoding of the 3D block 910, in an embodiment of the disclosure, is described next herein.

At 904A, a mode selection operation may be executed. In the mode selection operation, the processor 204 may be configured to apply a convolutional neural network (CNN) on the 3D block 910 to generate a mode prediction (e.g., a predicted mode 912A) for the 3D block 910. The convolution neural network may be trained on a task of mode prediction. A training dataset for the mode prediction task may include 3D blocks of sample point clouds and one or more modes that may be used to encode the corresponding 3D blocks. In an embodiment, the convolution neural network (CNN) may be stored in the memory 210 and may be used to select the one or more modes for the 3D block 910. The mode prediction may be included in the mode decision information (i.e., determined before the mode(s) are selected) and the one or more modes may be selected based on the mode prediction. The CNN may be similar to the DNN models described further, for example, in FIG. 3.

At 906A, a mode-based encoding operation may be executed. In the mode-based encoding operation, the encoder 206 may encode the 3D block 910 based on the selected one or more modes to generate an encoded 3D block 914A. In an embodiment, the selected one or more modes may include only one mode. In such case, rate-distortion based optimization may not be required and the encoder 206 may directly encode the 3D block 910 based on the single selected mode. As an example, in case the selected one or more modes includes a single mode (for example, mode '4') and the plurality of modes include 5 modes, the encoder 206 may be required to execute only one encoding operation to encode each 3D block. The table 520 may not be required in this case. Conventional solutions that implement a plurality of modes (e.g., 5 modes) require the encoder to execute at least 5 encoding operations and 5 decoding operations to encode each 3D block. Thus, by use of the CNN, the disclosed electronic device 102 may achieve a coding efficiency gain of more than 5 (i.e., (5*E+5*D)/E or 5+5*(D/E)) over that offered by conventional solutions, if encoding and decoding complexities are different. Whereas, if encoding and decoding complexity are equal, the disclosed electronic device 102 may achieve a coding efficiency gain of 10 over that offered by conventional solutions. E and D represent encoding complexity and decoding complexity, respectively.

Figure 9B:
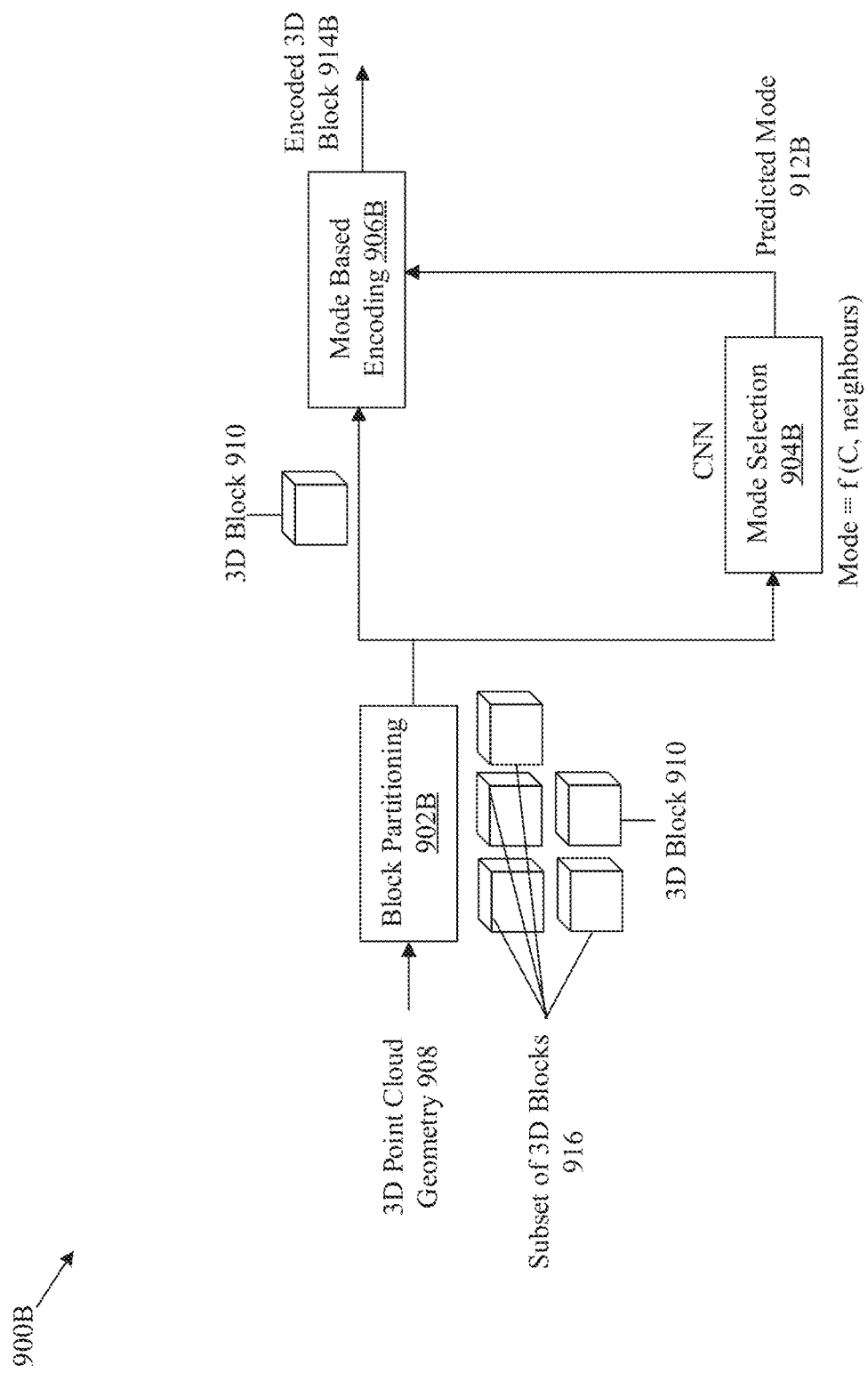
FIG. 9B is a diagram that illustrates an exemplary processing pipeline for adaptive mode selection for point cloud compression, in accordance with an embodiment of the disclosure.

FIG. 9B is a diagram that illustrates an exemplary processing pipeline for adaptive mode selection for point cloud compression, in accordance with an embodiment of the disclosure. FIG. 9B is explained in conjunction with elements from FIG. 1, FIG. 2, FIG. 3, FIG. 4, FIG. 5, FIG. 6, FIG. 7, FIG. 8A, FIG. 8B, and FIG. 9A. With reference to FIG. 9B, there is shown a processing pipeline 900B for adaptive mode selection for point cloud compression. In the processing pipeline 900B, there is shown a sequence of operations including 902B, 904B, and 906B. The sequence of operations may be executed by the circuitry 202 of the electronic device 102. There is also shown outputs obtained at the individual stages of operation.

At 902B, a block partitioning operation may be executed. In the block partitioning operation, the processor 204 may be configured to partition an input point cloud geometry (such as, the 3D point cloud geometry 908) into a set of 3D blocks, such as, the set of 3D blocks 408A. The set of 3D blocks 408A may include the 3D block 910. The block partitioning operation is described further, for example, in FIG. 4 (at 408). The processor 204 may be further configured to determine a subset of 3D blocks (for example, a subset of 3D blocks 916) in a neighborhood of the 3D block 910. The encoding of the 3D block 910, in an embodiment of the disclosure, is described next herein.

At 904B, a mode selection operation may be executed. In the mode selection operation, the processor 204 may be configured to apply a convolutional neural network (CNN) on the 3D block 910 and the subset of 3D blocks 916 in the neighborhood of the 3D block 910 of the 3D point cloud geometry 908. Based on the application of the convolution neural network, the encoder 206 may generate a mode prediction (e.g., a predicted mode 912B) for the 3D block 910. The convolution neural network may be trained on a task of mode prediction. A training dataset for the mode prediction task may include 3D blocks of sample point clouds and one or more modes that may be used to encode the corresponding 3D blocks. In an embodiment, the convolution neural network (CNN) may be stored in the memory 210 and may be used to select the one or more modes for the 3D block 910. The mode prediction may be included in the mode decision information (i.e., determined before the mode(s) are selected) and the one or more modes may be selected based on the mode prediction. In the current case, the one or more modes may be selected based on the mode prediction included in the mode decision information may be a single mode. The 3D block 910 may be encoded based on the single model indicated by the mode prediction in the mode decision information. Details related to the convolution neural network model are described further, for example, in FIG. 9A.

At 906B, a mode-based encoding operation may be executed. In the mode-based encoding operation, the encoder 206 may encode the 3D block 910 based on the selected one or more modes to generate an encoded 3D block 914B. In an embodiment, the selected one or more modes may include only one mode. In such case, rate-distortion based optimization may not be required and the encoder 206 may directly encode the 3D block 910 based on the single selected mode. As an example, in case the selected one or more modes includes a single mode (for example, mode '4') and the plurality of modes include 5 modes, the encoder 206 may be required to execute only one encoding operation to encode each 3D block. Further, the table 520 may not be required to be generated herein. However, in conventional solutions, as the plurality of modes includes 5 modes, the encoder may be required to execute at least 5 encoding operations and 5 decoding operations to encode each 3D block. Thus, the disclosed electronic device 102 may achieve a coding efficiency gain of more than 5 (i.e., (5*E+5*D)/E or 5+5*(D/E)) over that offered by conventional solutions, if encoding and decoding complexities are different. Whereas, if encoding and decoding complexity are equal, the disclosed electronic device 102 may achieve a coding efficiency gain of 10 over that offered by conventional solutions. E and D represent encoding complexity and decoding complexity, respectively.

Figure 10:
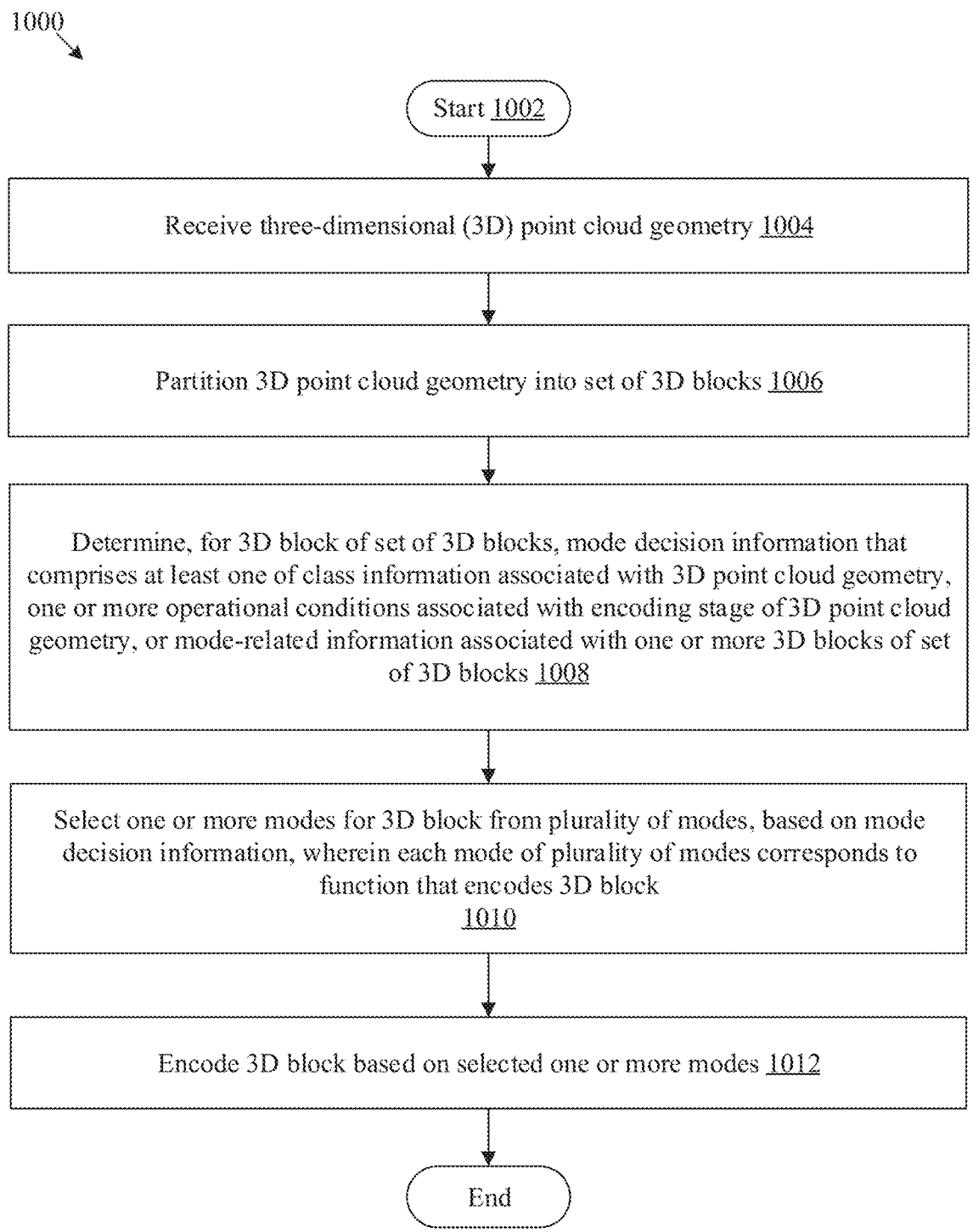
FIG. 10 is a flowchart that illustrates exemplary operations for adaptive mode selection for point cloud compression, in accordance with an embodiment of the disclosure.

FIG. 10 is a flowchart that illustrates exemplary operations for adaptive mode selection for point cloud compression, in accordance with an embodiment of the disclosure. With reference to FIG. 10, there is shown a flowchart 1000. The flowchart 1000 is described in conjunction with elements from FIG. 1, FIG. 2, FIG. 3, FIG. 4, FIG. 5, FIG. 6, FIG. 7, FIG. 8A, FIG. 8B, FIG. 9A, and FIG. 9B. The operations 1002 to 1012 may be implemented in the electronic device 102. The method described in the flowchart 1000 may start at 1002 and proceed to 1004.

At 1004, a 3D point cloud geometry (e.g., the 3D point cloud geometry 112) may be received. In an embodiment, the circuitry 202 may be configured to receive the 3D point cloud geometry 112. The 3D point cloud geometry 112 may be received from the scanning setup 106, via the communication network 110. The reception of the 3D point cloud geometry is described further, for example, in FIG. 4.

At 1006, the 3D point cloud geometry 112 may be partitioned into a set of 3D blocks (e.g., the set of 3D blocks 408A). In an embodiment, the circuitry 202 may be configured to partition the 3D point cloud geometry 112 into the set of 3D blocks 408A. The partitioning of the 3D point cloud geometry is described further, for example, in FIG. 4.

At 1008, determine for a 3D block of the set of 3D blocks, mode decision information (e.g., the mode decision information 412A) that comprises at least one of, but not limited to, class information associated with the 3D point cloud geometry 112, one or more operational conditions associated with an encoding stage of the 3D point cloud geometry 112, or mode-related information associated with one or more 3D blocks of the set of 3D blocks 408A. In an embodiment, mode decision information 412A may include at least one of, but not limited to, class information associated with the 3D point cloud geometry 112, one or more operational conditions associated with an encoding stage of the 3D point cloud geometry 112, or mode-related information associated with one or more 3D blocks of the set of 3D blocks 408A. In an embodiment, the circuitry 202 may be configured to determine the mode decision information 412A for the 3D block 416 of the set of 3D blocks 408A. The determination of the mode decision information is described further, for example, in FIGS. 4, 5, 6, 7, 8A, 8B, 9A, and 9B.

At 1010, select one or more modes for a 3D block from the plurality of modes, based on the mode decision information wherein each mode of the plurality of modes corresponds to a function that encodes a 3D block. Herein, each mode of the plurality of modes may correspond to a function that may encode the 3D block 416. In an embodiment, the circuitry 202 may be configured to select the one or more modes, from the plurality of modes, for the 3D block 416, based on the mode decision information 412A. The selection of the one or more modes is described further, for example, in FIGS. 4, 5, 6, 7, 8A, 8B, 9A, and 9B.

At 1012, the 3D block 416 may be encoded based on the selected one or more modes. In an embodiment, the circuitry 202 may be configured to encode the 3D block 416 based on the selected one or more modes. The encoding of the 3D block based on the selected one or more modes is described further, for example, in FIGS. 4, 5, 6, 7, 8A, 8B, 9A, and 9B. Control may pass to the end.

Although the flowchart 1000 is illustrated as discrete operations, such as 1004, 1006, 1008, 1010, and 1012 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102). Such instructions may cause the electronic device 102 to perform operations that include reception of a three-dimensional (3D) point cloud geometry (e.g., the 3D point cloud geometry 112). The operations may further include partitioning of the 3D point cloud geometry 112 into a set of 3D blocks (e.g., the set of 3D blocks 408A). The operations may further include a determination, for a 3D block 416 of the set of 3D blocks 408A, of mode decision information (e.g., the mode decision information 412A). The mode decision information 412A may include at least one of, but not limited to, class information associated with the 3D point cloud geometry 112, one or more operational conditions associated with an encoding stage of the 3D point cloud geometry 112, or mode-related information associated with one or more 3D blocks of the set of 3D blocks 408A. The operations may further include a selection of one or more modes for the 3D block 416 from a plurality of modes, based on the mode decision information 412A. Herein, each mode of the plurality of modes may correspond to a function that may encodes the 3D block 416. The operations may further include an encoding of the 3D block 416 based on the selected one or more modes.

Exemplary aspects of the disclosure may provide a first electronic device (such as, the first electronic device 102 of FIG. 1) that includes circuitry (such as, the circuitry 202). The circuitry 202 may be configured to receive a three-dimensional (3D) point cloud geometry (e.g., the 3D point cloud geometry 112). The circuitry 202 may be further configured to partition of the 3D point cloud geometry 112 into a set of 3D blocks (e.g., the set of 3D blocks 408A). The circuitry 202 may be further configured to determine, for a 3D block 416 of the set of 3D blocks 408A, of mode decision information (e.g., the mode decision information 412A). The mode decision information 412A may include at least one of, but not limited to, class information associated with the 3D point cloud geometry 112, one or more operational conditions associated with an encoding stage of the 3D point cloud geometry 112, or mode-related information associated with one or more 3D blocks of the set of 3D blocks 408A. The circuitry 202 may be further configured to select one or more modes for the 3D block 416 from a plurality of modes, based on the mode decision information 412A. Herein, each mode of the plurality of modes may correspond to a function that may encodes the 3D block 416. The circuitry 202 may be further configured to encode of the 3D block 416 based on the selected one or more modes.

In an embodiment, the class information associated with the 3D point cloud geometry 112 may include at least one of, but not limited to, a geometry bit-depth, a density, or a point distribution associated with the 3D point cloud geometry 112. Further, the one or more operational conditions associated with the encoding stage of the 3D point cloud geometry 112 may include, but are not limited to, a target rate-distortion cost associated with 3D point cloud geometry 112.

In an embodiment, the circuitry 202 may be configured to load a table that may map the plurality of modes with classes and operational conditions. The circuitry 202 may be configured to search the table using the class information and the one or more operational conditions to select the one or more modes.

In an embodiment, the circuitry 202 may be configured to partition a calibration point cloud into a plurality of 3D blocks. The circuitry 202 may be further configured to encode the plurality of 3D blocks based on each of the plurality of modes to generate a plurality of encoded 3D blocks. The circuitry 202 may be further configured to determine a rate-distortion cost associated with each of the determined plurality of encoded 3D blocks. Further, the circuitry 202 may be configured to determine statistical information that may indicate, for each mode of the plurality of modes, a fraction of the plurality of encoded 3D blocks for which the rate-distortion cost is minimum for the plurality of modes. The circuitry 202 may be configured to determine, from the generated plurality of encoded 3D blocks, a subset of encoded 3D blocks for which the fraction of the plurality of encoded 3D blocks is above a threshold, based on the determined statistical information. The circuitry 202 may be further configured to determine, from the plurality of modes, a subset of modes that is used in the generation of the subset of encoded 3D blocks. The circuitry 202 may be configured to generate the table based on the determined subset of modes, the classes, and the operational conditions.

In an embodiment, the circuitry 202 may be configured to encode the 3D block 416 based on each of the one or more selected modes to determine one or more encoded 3D blocks. Further, the circuitry 202 may be configured to determine rate-distortion costs associated with the selected one or more encoded 3D blocks. The circuitry 202 may be configured to determine a mode of the selected one or more modes as an optimal mode for the encoding stage, based on a determination that a rate-distortion cost associated with the mode corresponds to a minimum of the determined rate-distortion costs. In other words, the circuitry 202 may determine, from the selected one or more modes, the mode as an optimal mode that minimizes the rate-distortion cost to encode the 3D block. The circuitry 202 may be further configured to encode the 3D block based on the determined mode to generate an encoded 3D block.

In an embodiment, the function corresponds to a Deep Neural Network (DNN) model that may be trained to encode the 3D block 416 of the 3D point cloud geometry 112 to generate an encoded 3D block. Each mode of the plurality of modes may correspond to an alpha parameter of a focal loss function used in a training stage of the DNN model. Further, the focal loss function may be configured to penalize a removal of non-empty voxels from the 3D block 416 of the 3D point cloud geometry 112.

In an embodiment, the circuitry 202 may be configured to determine subsets of the set of 3D blocks 408A, based on a scan of the set of 3D blocks 408A in a defined scan order. The circuitry 202 may be configured to encode each 3D block of a first subset of the determined subsets, based on the plurality of modes to generate a plurality of encoded 3D blocks. Further, the circuitry 202 may be configured to determine a rate-distortion cost associated with each encoded 3D block of the plurality of encoded 3D blocks. The circuitry 202 may be configured to determine mode usage statistics associated with the first subset based on the determined rate-distortion cost associated with each encoded 3D block of the plurality of encoded 3D blocks. Herein, the mode-related information may include the determined mode usage statistics associated with the first subset. The circuitry 202 may be further configured to select the one or more modes for a second subset that includes the 3D block 416. Herein, the second subset may be included in the determined subsets, and the second subset may succeed the first subset in accordance with the scan order.

In an embodiment, the circuitry 202 may be configured to determine, from the set of 3D blocks 408A, a subset of 3D blocks that may be in a neighborhood of the 3D block 416, based on a spatial arrangement of the set of 3D blocks 408A in the 3D point cloud geometry 112. Herein, the selection of the one or more modes may be based on a usage of the one or more modes to encode each 3D block of the subset of 3D blocks into a respective encoded 3D block.

In an embodiment, the circuitry 202 may be configured to determine point cloud metrics including the class information associated with the 3D block 416. Herein, the one or more modes may be selected further based on the application of a classifier model on the point cloud metrics, and the classifier model may be a machine learning model that may be trained on a task of mode prediction.

In an embodiment, the circuitry 202 may be configured to determine point cloud metrics including the class information associated with the 3D block and a subset of 3D blocks in a neighborhood of the 3D block 416 of the 3D point cloud geometry 112. Herein, the one or more modes may be selected further based on the application of a classifier model on the point cloud metrics, and the classifier model may be a machine learning model that may be trained on a task of mode prediction.

In an embodiment, the circuitry 202 may be configured to apply a convolutional neural network on the 3D block 416 to generate a mode prediction for the 3D block 416. Herein, the mode prediction may be included in the mode decision information 412A, and the one or more modes may be selected based on the mode prediction.

In an embodiment, the circuitry 202 may be configured to apply a convolutional neural network on the 3D block 416 and a subset of 3D blocks in a neighborhood of the 3D block 416 of the 3D point cloud geometry 112, to generate a mode prediction for the 3D block 416. Herein, the mode prediction may be included in the mode decision information 412A, and the one or more modes may be selected based on the mode prediction.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
    circuitry configured to:
        receive a three-dimensional (3D) point cloud geometry;
        partition the 3D point cloud geometry into a set of 3D blocks;
        determine, for a 3D block of the set of 3D blocks, mode decision information that comprises at least one of:
            class information associated with the 3D point cloud geometry,
            one or more operational conditions associated with an encoding stage of the 3D point cloud geometry, or
            mode-related information associated with one or more 3D blocks of the set of 3D blocks;
        select one or more modes for the 3D block of the 3D point cloud geometry from a plurality of modes, based on the mode decision information,
            wherein each mode of the plurality of modes corresponds to an encoding function for the 3D block of the point cloud geometry,
            the plurality of modes further corresponds to a plurality of density levels,
            each density level of the plurality of density levels corresponds to a median of a distribution of local density values associated with 3D points in a 3D block of a calibration point cloud of a plurality of calibration point clouds, and
            each of the local density values is a number of neighborhood points within a spherical volume around each 3D point in the 3D block of the calibration point cloud; and
        encode the 3D block of the 3D point cloud geometry based on the selected one or more modes.

2. The electronic device according to claim 1, wherein the class information associated with the 3D point cloud geometry includes at least one of a geometry bit-depth, a density level of the plurality of density levels, or a point distribution associated with the 3D point cloud geometry.

3. The electronic device according to claim 1, wherein the one or more operational conditions associated with the encoding stage of the 3D point cloud geometry includes a target rate-distortion cost associated with 3D point cloud geometry.

4. The electronic device according to claim 1, wherein the circuitry is further configured to:
    load a table that maps the plurality of modes with different classes associated with the plurality of calibration point clouds and operational conditions associated with an encoding stage of the plurality of calibration point clouds, wherein each calibration point cloud of the plurality of calibration point clouds is different from the received 3D point cloud geometry; and
    search the table based on the class information and the one or more operational conditions to select the one or more modes.

5. The electronic device according to claim 4, wherein the circuitry is further configured to:
    partition the calibration point cloud of the plurality of calibration point clouds into a plurality of 3D blocks;
    encode the plurality of 3D blocks based on each of the plurality of modes to generate a plurality of encoded 3D blocks;
    determine a rate-distortion cost associated with each of the generated plurality of encoded 3D blocks;
    determine statistical information that indicates, for each mode of the plurality of modes, a fraction of the plurality of encoded 3D blocks for which the rate-distortion cost is a minimum for the plurality of modes;
    determine, from the generated plurality of encoded 3D blocks, a subset of encoded 3D blocks for which the fraction of the plurality of encoded 3D blocks is above a threshold, based on the determined statistical information;
    determine, from the plurality of modes, a subset of modes that is used in the generation of the subset of encoded 3D blocks; and
    generate the table based on the determined subset of modes, the different classes, and the operational conditions, wherein the table is generated prior to the encode of the 3D block of the 3D point cloud geometry.

6. The electronic device according to claim 1, wherein the circuitry is further configured to:
    encode the 3D block of the 3D point cloud geometry based on each of the selected one or more modes to determine one or more encoded 3D blocks;
    determine rate-distortion costs associated with the determined one or more encoded 3D blocks;
    determine a mode of the selected one or more modes as an optimal mode for the encoding stage, based on a determination that a rate-distortion cost associated with the mode corresponds to a minimum of the determined rate-distortion costs; and
    encode the 3D block of the 3D point cloud geometry based on the determined mode to generate an encoded 3D block.

7. The electronic device according to claim 1, wherein the encoding function corresponds to a Deep Neural Network (DNN) model that is trained to encode the 3D block of the 3D point cloud geometry to generate an encoded 3D block.

8. The electronic device according to claim 7, wherein each mode of the plurality of modes corresponds to an alpha parameter of a focal loss function used in a training stage of the DNN model, and
    the focal loss function is configured to penalize a removal of non-empty voxels from the 3D block of the 3D point cloud geometry.

9. The electronic device according to claim 1, wherein the circuitry is further configured to:
    determine subsets of the set of 3D blocks, based on a scan of the set of 3D blocks in a defined scan order;
    encode each 3D block of a first subset of the determined subsets, based on the plurality of modes to generate a plurality of encoded 3D blocks;
    determine a rate-distortion cost associated with each encoded 3D block of the plurality of encoded 3D blocks; and
    determine mode usage statistics associated with the first subset based on the determined rate-distortion cost associated with each encoded 3D block of the plurality of encoded 3D blocks, wherein the mode-related information includes the determined mode usage statistics associated with the first subset.

10. The electronic device according to claim 9, wherein the circuitry is further configured to select the one or more modes for a second subset that includes the 3D block of the 3D point cloud geometry, wherein
the second subset is included in the determined subsets, and
the second subset succeeds the first subset in accordance with the defined scan order.

11. The electronic device according to claim 1, wherein the circuitry is further configured to determine, from the set of 3D blocks, a subset of 3D blocks that is in a neighborhood of the 3D block of the 3D point cloud geometry, based on a spatial arrangement of the set of 3D blocks in the 3D point cloud geometry, and
wherein the selection of the one or more modes is based on a usage of the one or more modes to encode each 3D block of the subset of 3D blocks into a respective encoded 3D block.

12. The electronic device according to claim 1, wherein the circuitry is further configured to determine point cloud metrics including the class information associated with the 3D block of the 3D point cloud geometry, wherein
the one or more modes is selected further based on an application of a classifier model on the point cloud metrics, and
the classifier model is a machine learning model that is trained on a task of mode prediction.

13. The electronic device according to claim 1, wherein the circuitry is further configured to determine point cloud metrics including the class information associated with the 3D block of the 3D point cloud geometry and a subset of 3D blocks in a neighborhood of the 3D block of the 3D point cloud geometry,
wherein the one or more modes is selected further based on an application of a classifier model on the point cloud metrics, and
the classifier model is a machine learning model that is trained on a task of mode prediction.

14. The electronic device according to claim 1, wherein the circuitry is further configured to apply a convolutional neural network on the 3D block of the 3D point cloud geometry to generate a mode prediction for the 3D block of the 3D point cloud geometry,
wherein the mode prediction is included in the mode decision information and the one or more modes are selected based on the mode prediction.

15. The electronic device according to claim 1, wherein the circuitry is further configured to apply a convolutional neural network on the 3D block of the 3D point cloud geometry and a subset of 3D blocks in a neighborhood of the 3D block of the 3D point cloud geometry, to generate a mode prediction for the 3D block of the 3D point cloud geometry,
wherein the mode prediction is included in the mode decision information and the one or more modes are selected based on the mode prediction.

16. A method, comprising:
in an electronic device:
receiving a three-dimensional (3D) point cloud geometry;
partitioning the 3D point cloud geometry into a set of 3D blocks;
determining, for a 3D block of the set of 3D blocks, mode decision information that comprises at least one of:
class information associated with the 3D point cloud geometry,
one or more operational conditions associated with an encoding stage of the 3D point cloud geometry, or
mode-related information associated with one or more 3D blocks of the set of 3D blocks;
selecting one or more modes for the 3D block of the point cloud geometry from a plurality of modes, based on the mode decision information,
wherein each mode of the plurality of modes corresponds to an encoding function for the 3D block of the 3D point cloud geometry,
the plurality of modes further corresponds to a plurality of density levels,
each density level of the plurality of density levels corresponds to a median of a distribution of local density values associated with 3D points in a 3D block of a calibration point cloud of a plurality of calibration point clouds, and
each of the local density values is a number of neighborhood points within a spherical volume around each 3D point in the 3D block of the calibration point cloud; and
encoding the 3D block of the 3D point cloud geometry based on the selected one or more modes.

17. The method according to claim 16, further comprising:
loading a table that maps the plurality of modes with different classes associated with the plurality of calibration point clouds and operational conditions associated with an encoding stage of the plurality of calibration point clouds, wherein each calibration point cloud of the plurality of calibration point clouds is different from the received 3D point cloud geometry; and
searching the table based on the class information and the one or more operational conditions to select the one or more modes.

18. The method according to claim 16, wherein the encoding function corresponds to a Deep Neural Network (DNN) model that is trained to encode the 3D block of the 3D point cloud geometry to generate an encoded 3D block.

19. The method according to claim 18, wherein each mode of the plurality of modes corresponds to an alpha parameter of a focal loss function used in a training stage of the DNN, and
the focal loss function is configured to penalize a removal of non-empty voxels from the 3D block of the 3D point cloud geometry.

20. A non-transitory computer-readable medium having stored thereon, computer-executable instructions that when executed by an electronic device, causes the electronic device to execute operations, the operations comprising:
receiving a three-dimensional (3D) point cloud geometry;
partitioning the 3D point cloud geometry into a set of 3D blocks;
determining, for a 3D block of the set of 3D blocks, mode decision information that comprises at least one of:
class information associated with the 3D point cloud geometry,
one or more operational conditions associated with an encoding stage of the 3D point cloud geometry, or
mode-related information associated with one or more 3D blocks of the set of 3D blocks;

selecting one or more modes for the 3D block of the point cloud geometry from a plurality of modes, based on the mode decision information,
  wherein each mode of the plurality of modes corresponds to an encoding function for the 3D block of the 3D point cloud geometry,
  the plurality of modes further corresponds to a plurality of density levels,
  each density level of the plurality of density levels corresponds to a median of a distribution of local density values associated with 3D points in a 3D block of a calibration point cloud of a plurality of calibration point clouds, and
  each of the local density values is a number of neighborhood points within a spherical volume around each 3D point in the 3D block of the calibration point cloud; and
encoding the 3D block of the point cloud geometry based on the selected one or more modes.

* * * * *